United States Patent [19]
Tsutsui et al.

[11] Patent Number: 5,834,557
[45] Date of Patent: Nov. 10, 1998

[54] GRAFT MODIFIED ETHYLENE/α-OLEFIN COPOLYMER COMPOSITION

[75] Inventors: Toshiyuki Tsutsui; Ken Yoshitsugu; Mamoru Takahashi; Akira Todo; Seiji Ohta; Hajime Inagaki, all of Waki-cho, Japan

[73] Assignee: Mitsui Chemicals, Inc., Tokyo, Japan

[21] Appl. No.: 872,937

[22] Filed: Jun. 11, 1997

Related U.S. Application Data

[60] Continuation of Ser. No. 449,921, May 25, 1995, Pat. No. 5,708,080, which is a division of Ser. No. 154,467, Nov. 18, 1993, Pat. No. 5,464,905.

[30] Foreign Application Priority Data

| | | | |
|---|---|---|---|
| Nov. 19, 1992 | [JP] | Japan | 4-310616 |
| Nov. 19, 1992 | [JP] | Japan | 4-310632 |

[51] Int. Cl.$^6$ .......................... C08L 23/08; C08F 255/02; C08F 255/04
[52] U.S. Cl. .................. 525/71; 525/74; 525/75; 525/78; 525/80; 525/193
[58] Field of Search .................. 525/74, 75, 78, 525/80, 193, 71

[56] References Cited

U.S. PATENT DOCUMENTS

| | | | |
|---|---|---|---|
| 3,231,636 | 1/1966 | Snyder et al. | |
| 3,862,265 | 1/1975 | Steinkamp et al. | 260/878 |
| 4,440,911 | 4/1984 | Inoue et al. | 525/74 |
| 4,530,914 | 7/1985 | Ewen et al. | |
| 4,587,303 | 5/1986 | Turtle | |
| 4,737,547 | 4/1988 | White | 525/193 |
| 4,793,956 | 12/1988 | Nogiwa et al. | |
| 4,801,652 | 1/1989 | Mizutani et al. | |
| 4,804,714 | 2/1989 | Olivo | |
| 5,051,481 | 9/1991 | Taka et al. | |
| 5,266,223 | 11/1993 | Song | 526/348 |
| 5,374,700 | 12/1994 | Tsutsui et al. | 526/348.2 |
| 5,382,630 | 1/1995 | Stehling et al. | 525/240 |
| 5,459,217 | 10/1995 | Todo et al. | 526/348.5 |
| 5,464,905 | 11/1995 | Tsutsui et al. | 525/193 |

FOREIGN PATENT DOCUMENTS

| | | |
|---|---|---|
| 2036196 | 2/1991 | Canada . |
| 1306817 | 8/1992 | Canada . |
| 0128046 | 12/1984 | European Pat. Off. . |
| 0447035 | 9/1991 | European Pat. Off. . |
| 0452920 | 10/1991 | European Pat. Off. . |
| 0492656 | 7/1992 | European Pat. Off. . |
| 5922946 | 2/1984 | Japan . |
| 59179543 | 10/1984 | Japan . |
| 9003414 | 4/1990 | WIPO . |

*Primary Examiner*—Donald R. Wilson
*Attorney, Agent, or Firm*—Sherman and Shalloway

[57] ABSTRACT

An ethylene/α-olefin copolymer composition including (I) a graft-modified ethylene/α-olefin copolymer composition and (II) a polyolefin. The graft-modified composition is prepared by graft copolymerizing an ethylene/α-olefin copolymer with a polar monomer. The ethylene/α-olefin copolymer composition includes first and second ethylene/α-olefin copolymers. The copolymers are each prepared in the presence of a polymerization catalyst containing (a) an organoaluminum oxy compound and (b) for the first ethylene/α-olefin copolymer at least two kinds, and for the second ethylene/α-olefin copolymer one kind, of compounds of Group IV transition metals of the periodic table containing a ligand having a cyclopentadienyl skeleton. The graft-modified ethylene/α-olefin copolymer composition is blended with a polyolefin, such as by mechanical or solution blending, at a weight ratio (I) to (II) of 1:99 to 99:1. The copolymer compositions have excellent moldability and heat stability properties and form films having high transparency and mechanical strength and good adhesion to polar materials.

5 Claims, 1 Drawing Sheet

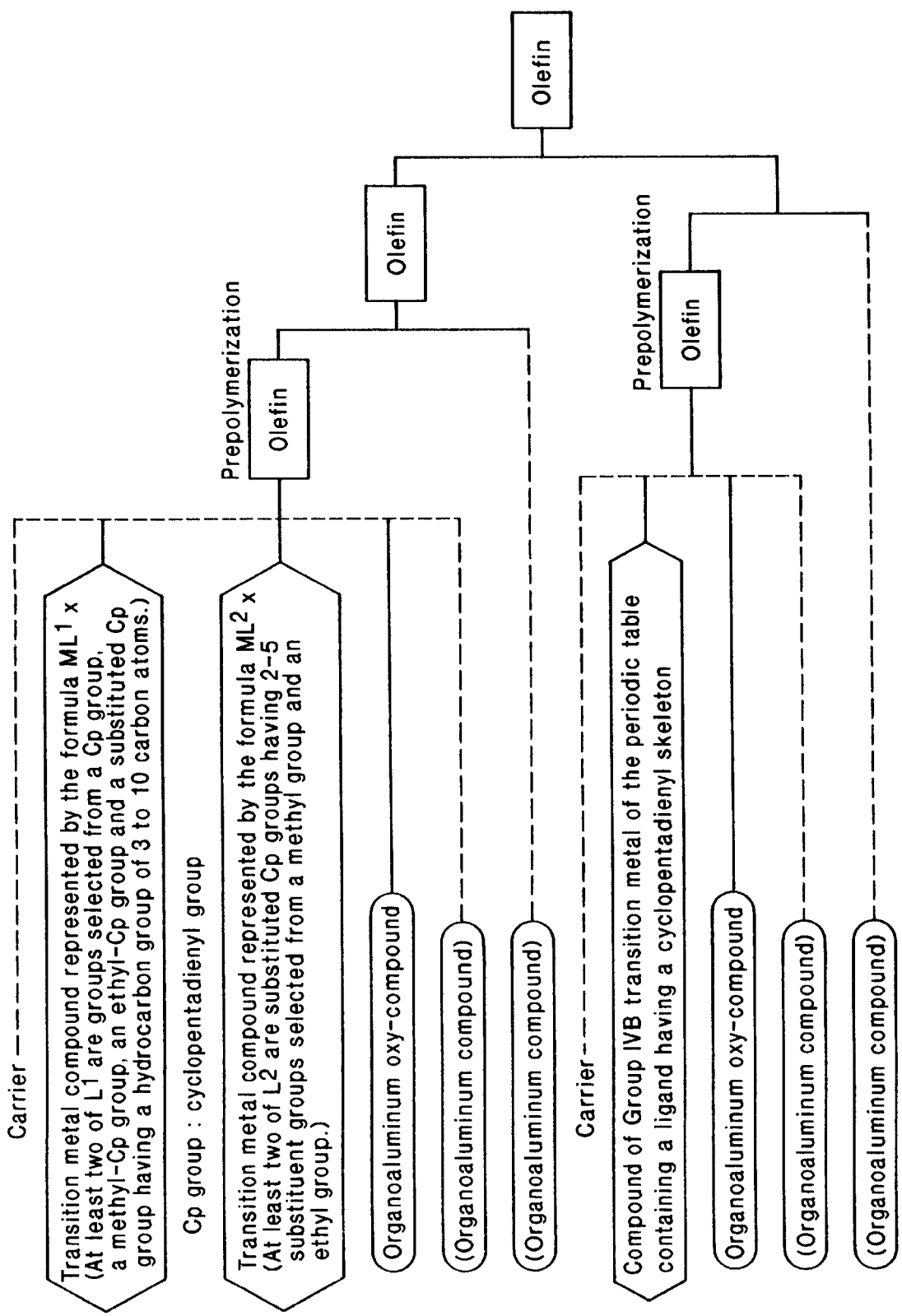

GRAFT MODIFIED ETHYLENE/α-OLEFIN COPOLYMER COMPOSITION

This is a continuing (division) of application Ser. No. 08/449,921, filed May 25, 1995, now U.S. Pat. 5,708,080, which in turn is a continuing (division) application Ser. No. 08/164,467, filed Nov. 18, 1993, now U.S. Pat. No. 5,464,905, which issued on Nov. 7, 1995.

FIELD OF THE INVENTION

The present invention relates to an ethylene/α-olefin copolymer composition having excellent properties such as high heat stability and good moldability, a graft modified ethylene/α-olefin copolymer composition having excellent properties such as good moldability and sufficient adhesion strength to metals or polar resins, an ethylene copolymer composition comprising the graft modified ethylene/α-olefin copolymer composition and polyolefin, and a multi-stage olefin polymerization process.

BACKGROUND OF THE INVENTION

Ethylene copolymers have heretofore been molded by various molding methods, and used in many fields. The requirement for the characteristics of the ethylene copolymers differs depending on the molding methods and uses. For example, when an inflation film is molded at a high speed, it is necessary to select an ethylene copolymer having a high melt tension compared with its molecular weight in order to stably conduct high speed molding without fluctuation or tearing of bubbles. An ethylene copolymer is required to have similar characteristics in order to prevent sag or tearing in blow molding, or to suppress width shortage to the minimum range in T-die molding. Further, in extrusion molding, it is important to have small stress under high shearing during extrusion in order to improve quality of molded article and reduce electric power consumption at molding.

By the way, Japanese Patent L-O-P Nos. 90810/1981 and 106806/1985 propose a method for improving moldability by improving the melt tension and die swell ratio of ethylene polymers obtained by using Ziegler type catalysts, especially a titanium type catalyst.

The ethylene polymers obtained by using a titanium catalyst, however, especially the low density ethylene polymers generally have problems such as their broad composition distribution and stickiness of their molded articles such as films.

Of the ethylene polymers prepared by using the Ziegler type catalysts, those obtained by using chromium type catalysts are relatively excellent in melt tension but has a defect of poor heat stability. This is thought to be caused by that the chain terminals of the ethylene polymers prepared by using the chromium type catalysts tend to become unsaturated bonds.

It is known that the ethylene polymers obtained by using a metallocene catalyst from among the Ziegler type catalysts have merits such as a narrow composition distribution and a low stickiness of their molded articles such as films. However, it is described in, for example Japanese Patent L-O-P. No. 35007/1985, that an ethylene polymer obtained by using a zirconocene compound formed from a cyclopentadienyl derivative contains one terminal unsaturated bond per molecule, and hence this ethylene polymer is presumably poor in heat stability similarly to the above-mentioned ethylene polymer obtained by using the chromium type catalyst. Further, because of its narrow composition distribution, this ethylene polymer might show poor flowability during the extrusion molding.

Accordingly, it will industrially be of great value to provide an ethylene copolymer, having good heat stability, high mechanical strength and a narrow composition distribution.

By the way, ethylene copolymers generally have no polar group in the molecule and are inherently non-polar, so that they are insufficient in adhesion strength to highly polar materials such as metals and polar resins. For these reasons, when such ethylene copolymers are used by bonding them with the highly polar materials, it is necessary to subject the surface of the ethylene copolymer to a flame treatment, a corona discharge treatment, a primer treatment or the like, and hence resulting in a problem of complicated operation.

Accordingly, it will also industrially be of great value to provide an ethylene copolymer or an ethylene copolymer composition, which has high melt tension, excellent flowability, good heat stability and high mechanical strength and shows sufficient adhesion strength to highly polar materials.

OBJECT OF THE INVENTION

It is, therefore, an object of the present invention to provide an ethylene/α-olefin copolymer composition of good moldability which is capable for giving a film having high transparency and high mechanical strength, to provide a graft modified ethylene/α-olefin copolymer composition of high heat stability and good moldability which is capable for giving a film having high transparency and good adhesion to highly polar materials, and to provide an ethylene copolymer composition containing said graft modified ethylene/α-olefin copolymer composition.

It is another object of the invention to provide a process for preparing an ethylene/α-olefin copolymer composition of good moldability which is capable of forming a film having high transparency and high mechanical strength.

SUMMARY OF THE INVENTION

The first ethylene/α-olefin copolymer composition according to the present invention is an ethylene/α-olefin copolymer composition comprising:

[A1] an ethylene/α-olefin copolymer in an amount of 20 to 90% by weight, which is obtained by copolymerizing ethylene with an α-olefin of 3 to 20 carbon atoms in the presence of a catalyst for olefin polymerization comprising (a) an organoaluminum oxy-compound and (b) at least two kinds of compounds of Group IV transition metals of the periodic table containing a ligand having a cyclopentadienyl skeleton, and which has such properties that:

(A-i) the density is in the range of 0.850 to 0.980 g/cm$^3$, and (A-ii) the intrinsic viscosity [η] as measured in decalin at 135° C. is in the range of 0.4 to 8 dl/g; and

[B1] an ethylene/α-olefin copolymer in an amount of 10 to 80% by weight, which is different from the ethylene/α-olefin copolymer [A1] and is obtained by copolymerizing ethylene with an α-olefin of 3 to 20 carbon atoms in the presence of a catalyst for olefin polymerization comprising (a) an organoaluminum oxy-compound and (b') a compound of Group IV transition metal of the periodic table containing a ligand having a cyclopentadienyl skeleton, and which has such properties that:

(B-i) the density is in the range of 0.850 to 0.980 g/cm³, and (B-ii) the intrinsic viscosity [η] as measured in decalin at 135° C. is in the range of 0.4 to 8 dl/g.

In the invention, the above-mentioned at least two kinds of compounds (b) of Group IVB transition metals of the periodic table containing a ligand having a cyclopentadienyl skeleton are preferably:

at least one kind of a transition metal compound represented by the following formula [b-I]:

$$ML^1_X \qquad [b\text{-}I]$$

wherein M is a transition metal atom selected from Group IVB of the periodic table, $L^1$ is a ligand coordinating to the transition metal atom M, at least two of $L^1$ are groups selected from a cyclopentadienyl group, a methylcyclopentadienyl group, an ethylcyclopentadienyl group and a substituted cyclopentadienyl group having at least one substituent group selected from a hydrocarbon group of 3 to 10 carbon atoms, $L^1$ other than the (substituted) cyclopentadienyl group is a hydrocarbon group of 1 to 12 carbon atoms, an alkoxy group, an aryloxy group, a trialkylsilyl group, a halogen atom or a hydrogen atom, and X is a valence of the transition metal atom M, and at least one kind of a transition metal compound represented by the following formula [b-II]:

$$ML^2_X \qquad [b\text{-}II]$$

wherein M is a transition metal atom selected from Group IVB of the periodic table, $L^2$ is a ligand coordinating to the transition metal atom, at least two of $L^2$ are substituted cyclopentadienyl groups having 2–5 substituent groups selected from a methyl group and an ethyl group, $L^2$ other than the substituted cyclopentadienyl group is a hydrocarbon group of 1 to 12 carbon atoms, an alkoxy group, an aryloxy group, a trialkylsilyl group, a halogen atom or a hydrogen atom, and X is a valence of the transition metal atom M.

The second ethylene/α-olefin copolymer composition according to the present invention is an ethylene/α-olefin copolymer composition comprising:

[A2] an ethylene/α-olefin copolymer in an amount of 20 to 90% by weight, which is a copolymer of ethylene with an (α-olefin of 3 to 20 carbon atoms and has such properties that:
 (A-i) the density is in the range of 0.850 to 0.980 g/cm³, and
 (A-ii) the intrinsic viscosity [η] as measured in decalin at 135° C. is in the range of 0.4 to 8 dl/g,
 (A-iii) the melt tension (MT (g)) at: 190° C. and the melt flow rate (MFR) satisfy the relation $$MT > 2.2 \times MFR^{-0.84},$$

(A-iv) the flow index (FI (1/sec)) defined by a shear rate which is given when a shear stress of molten copolymer at 190° C. reaches $2.4 \times 10^6$ dyne/cm² and the melt flow rate (MFR) satisfy the relation $$FI < 150 \times MFR,$$

(A-v) the molecular weight distribution (Mw/Mn) measured by GPC is in the range of 1.5 to 4, and
 (A-vi) MT/(Mw/Mn) and FI/MFR satisfy the relation $$MT/(Mw/Mn) > 0.03 \times FI/MFR - 3.0$$

with the proviso that when the value of 0.03×FI/MFR−3.0 is less than 0, it is taken as 0; and

[B1] an ethylene/α-olefin copolymer in an amount of 10 to 80% by weight, which is different from the ethylene/α-olefin copolymer [A2] and is obtained by copolymerizing ethylene with an (α-olefin of 3 to 20 carbon atoms in the presence of a catalyst for olefin polymerization comprising (a) an organoaluminum oxy-compound and (b') a compound of Group IV transition metal of the periodic table containing a ligand having a cyclopentadienyl skeleton, and which has such properties that:
 (B-i) the density is in the range of 0.850 to 0.980 g/cm³, and
 (B-ii) the intrinsic viscosity [η] as measured in decalin at 135° C. is in the range of 0.4 to 8 dl/g.

The ethylene/α-olefin copolymer composition of the invention is excellent in heat resistance and moldability. From this composition, a film having high transparency, high mechanical strength and high blocking resistance can be produced.

The graft modified ethylene/α-olefin copolymer composition according to the present invention is a graft modified ethylene/α-olefin copolymer composition obtained by graft copolymerizing an ethylene/α-olefin copolymer composition with a polar monomer, wherein the ethylene/α-olefin copolymer composition comprises:

[A3] an ethylene/α-olefin copolymer in an amount of 20 to 90% by weight, which is obtained by copolymerizing ethylene with an α-olefin of 3 to 20 carbon atoms in the presence of a catalyst for olefin polymerization comprising (a) an organoaluminum oxy-compound and (b') a compound of Group IV transition metal of the periodic table containing a ligand having a cyclopentadienyl skeleton, and which has such properties that:
 (A-i) the density is in the range of 0.850 to 0.980 g/cm³, and
 (A-ii) the intrinsic viscosity [η] as measured in decalin at 135° C. is in the range of 0.4 to 8 dl/g; and

[B1] an ethylene/α-olefin copolymer in an amount of 10 to 80% by weight, which is different from the ethylene/α-olefin copolymer [A3] and is obtained by copolymerizing ethylene with an (α-olefin of 3 to 20 carbon atoms in the presence of a catalyst for olefin polymerization comprising (a) an organoaluminum oxy-compound and (b') a compound of Group IV transition metal of the periodic table containing a ligand having a cyclopentadienyl skeleton, and which has such properties that:
 (B-i) the density is in the range of 0.850 to 0.980 g/cm³, and
 (B-ii) the intrinsic viscosity [η] as measured in decalin at 135° C. is in the range of 0.4 to 8 dl/g.

The graft modified ethylene/α-olefin copolymer composition of the invention is excellent in moldability. From this composition, a film having high transparency and good adhesion to highly polar materials can be produced.

The ethylene copolymer composition according to the present invention is an ethylene copolymer composition comprising:

[I] a graft modified ethylene/α-olefin copolymer composition obtained by graft copolymerizing an ethylene/α-olefin copolymer composition with a polar monomer, said ethylene/α-olefin copolymer composition comprising:

[A3] an ethylene/α-olefin copolymer in an amount of 20 to 90% by weight, which is obtained by copolymerizing ethylene with an α-olefin of 3 to 20 carbon atoms in the presence of a catalyst for olefin polymerization comprising (a) an organoaluminum oxy-compound and (b') a compound of Group IV transition metal of the periodic table containing a ligand having a cyclopentadienyl skeleton, and which has such properties that:
(A-i) the density is in the range of 0.850 to 0.980 g/cm$^3$, and
(A-ii) the intrinsic viscosity [η] as measured in decalin at 135° C. is in the range of 0.4 to 8 dl/g; and
[B1] an ethylene/α-olefin copolymer in an amount of 10 to 80% by weight, which is different from the ethylene/α-olefin copolymer [A3] and is obtained by copolymerizing ethylene with an α-olefin of 3 to 20 carbon atoms in the presence of a catalyst for olefin polymerization comprising (a) an organoaluminum oxy-compound and (b') a compound of Group IV transition metal of the periodic table containing a ligand having a cyclopentadienyl skeleton, and which has such properties that:
(B-i) the density is in the range of 0.850 to 0.980 g/cm$^3$, and
(B-ii) the intrinsic viscosity [α] as measured in decalin at 135° C. is in the range of 0.4 to 8 dl/g; and
[II] polyolefin;
wherein a weight ratio ([I]:[II]) between the graft modified ethylene/α-olefin copolymer composition [I] and the polyolefin [II] is in the range of 1:99 to 99:1.

The ethylene copolymer composition of the invention is excellent in moldability. From this composition, a film having high transparency and good adhesion to highly polar materials can be produced.

The multi-stage olefin polymerization process according to the present invention comprises:
a stage (1) of preparing an ethylene/α-olefin copolymer [A1] by copolymerizing ethylene with an α-olefin of 3 to 20 carbon atoms in the presence of a catalyst for olefin polymerization (C1) comprising:
(a) an organoaluminum oxy-compound,
(b-I) at least one kind of a transition metal compound represented by the above formula [b-I], and
(b-II) at least one kind of a transition metal compound represented by the above formula [b-II]; and
a stage (2) of preparing an ethylene/α-olefin copolymer [B1] by copolymerizing ethylene with an α-olefin of 3 to 20 carbon atoms in a different polymerizer from the polymerizer for the copolymerization reaction of the stage (1) in the presence of a catalyst for olefin polymerization (C2) comprising (a) an organoaluminum oxy-compound and (b') a compound of Group IV transition metal of the periodic table containing a ligand having a cyclopentadienyl skeleton.

In the invention, the catalyst for olefin polymerization (C1) used for the copolymerization stage (1) may be a catalyst further containing an organoaluminum compound (c) in addition to the organoaluminum oxy-compound (a), the transition metal compound (b-I) and the transition metal compound (b-II); a solid catalyst in which the organoaluminum oxy-compound (a), the transition metal compound (b-I) and the transition metal compound (b-II) are supported on a carrier; or a prepolymerized catalyst obtained by prepolymerizing an olefin on a solid catalyst component, in said solid catalyst component the organoaluminum oxy-compound (a), the transition metal compound (b-I) and the transition metal compound (b-II) being supported on a carrier. Otherwise, the catalyst (C1) may be a catalyst comprising the above-mentioned solid catalyst (solid catalyst component) and the organoaluminum compound (c), or may be a catalyst comprising the above-mentioned prepolymerized catalyst (prepolymerized catalyst component) and the organoaluminum compound (c).

Further, the catalyst for olefin polymerization (C2) used for the copolymerization stage (2) may be a catalyst further containing an organoaluminum compound (c) in addition to the organoaluminum oxy-compound (a) and the transition metal compound (b'); a solid catalyst in which the organoaluminum oxy-compound (a) and the transition metal compound (b') are supported on a carrier; or a prepolymerized catalyst obtained by prepolymerizing an olefin on a solid catalyst component, in said solid catalyst component the organoaluminum oxy-compound (a) and the transition metal compound (b') being supported on a carrier. Otherwise, the catalyst (C2) may be a catalyst comprising the above-mentioned solid catalyst (solid catalyst component) and the organoaluminum compound (c), or may be a catalyst comprising the above-mentioned prepolymerized catalyst (prepolymerized catalyst component) and the organoaluminum compound (c).

According to the multi-stage olefin polymerization process, there can be obtained an ethylene copolymer composition which has high heat stability and good moldability and from which a film having high transparency and high mechanical strength can be produced.

BRIEF DESCRIPTION OF THE DRAWING

The FIG. 1 is an explanatory view of a process for preparing a catalyst for olefin polymerization which is used for the multi-stage olefin polymerization process according to the present invention.

DETAILED DESCRIPTION OF THIE INVENTION

The ethylene/α-olefin copolymer composition, the graft modified ethylene/α-olefin copolymer composition, the ethylene copolymer composition and the multi-stage olefin polymerization process, according to the present invention, will be described in detail hereinafter.

First, the ethylene/α-olefin copolymer composition of the invention will be described below.

The first ethylene/α-olefin copolymer composition of the invention is formed from an ethylene/α-olefin copolymer [A1] and an ethylene/α-olefin copolymer [B1] which is different from the ethylene/cc-olefin copolymer [A1], both being described later. The second ethylene/α-olefin copolymer composition of the invention is formed from an ethylene/α-olefin copolymer [A2] described later and the ethylene/α-olefin copolymer [B1] which is different from the ethylene/α-olefin copolymer [A2].

[Ethylene/α-olefin copolymer]

The ethylene/α-olefin copolymers [A1] and [A2] which form the ethylene/α-olefin copolymer composition according to the invention are each a random copolymer of ethylene with an α-olefin of 3 to 20 carbon atoms. Examples of the α-olefin of 3 to 20 carbon atoms employable for the copolymerization with ethylene include propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In each of the ethylene/α-olefin copolymers [A1] and [A2], it is desired that constituent units derived from ethylene are present in an amount of 50 to 100% by weight, preferably 55 to 99% by weight, more preferably 65 to 98% by weight, most preferably 70 to 96% by weight, and constituent units derived from an α-olefin of 3 to 20 carbon atoms are present in an amount of 0 to 50% by weight, preferably 1 to 45% by weight, more preferably 2 to 35% by weight, most preferably 4 to 30% by weight.

The composition of an ethylene/αolefin copolymer is generally determined by $^{13}$C-NMR spectrum analysis of a sample prepared by homogeneously dissolving about 200 mg of the copolymer in 1 ml of hexachlorobutadiene in a sample tube having a diameter of 10 mm under the conditions of a measuring temperature of 120° C., a measuring frequency of 25.05 MHz, a spectrum width of 1,500 Hz, a pulse repetition period of 4.2 sec and a pulse width of 6 μsec.

The ethylene/α-olefin copolymer [A1] which forms the first ethylene/α-olefin copolymer composition according to the invention preferably has the following properties (A-i) and (A-ii), and particularly preferably has the following properties (A-i) to (A-viii). The ethylene/α-olefin copolymer [A2] which forms the second ethylene/α-olefin copolymer composition according to the invention preferably has the following properties (A-i) to (A-vi), and particularly preferably has the following properties (A-i) to (A-viii).

(A-i) The density (d) is in the range of usually 0.850 to 0.980 g/cm$^3$, preferably 0.880 to 0.940 g/cm$^3$, more preferably 0.890 to 0.935 g/cm$^3$, most preferably 0.900 to 0.930 g/cm$^3$.

The density (d) is determined by means of a density gradient tube using a strand, which has been obtained at the time of measurement of a melt flow rate (MFR) at 190° C. under a load of 2.16 kg and which is treated by heating at 120° C. for 1 hour and slowly cooling to room temperature over 1 hour.

(A-ii) The intrinsic viscosity [η] as measured in decalin at 135° C. is in the range of usually 0.4 to 8 dl/g, preferably 1.25 to 8 dl/g, more preferably 1.27 to 6 dl/g.

(A-iii) The melt tension (MT (g)) at 190° C. and the melt flow rate (MFR) satisfy the relation:

$$MT>2.2\times MFR^{-0.84},$$

preferably $8.0\times MFR^{-0.84}>MT>2.3\times MFR^{0.84}$, more preferably $7.5\times MFR^{-0.84}>MT>2.5\times MFR^{-0.84}$, An ethylene/α-olefin copolymer having such properties shows good moldability because of high melt tension (MT).

The melt tension (MT (g)) is determined by measuring a stress given when a molten copolymer is stretched at a constant rate. That is, a powdery polymer was melted in a conventional manner, and the molten polymer was pelletized to give a measuring sample. Then, the MT of the sample was measured under the conditions of a resin temperature of 190° C., an extrusion rate of 15 mm/min and a take-up rate of 10 to 20 m/min using a MT measuring apparatus (produced by Toyo Seiki Seisakusho K.K.) having a nozzle diameter of 2.09 mmφ and a nozzle length of 8 mm. During the pelletization, to the ethylene/α-olefin copolymer were added 0.05% by weight of tri(2,4-di-t-butylphenyl) phosphate as a secondary antioxidant, 0.1% by weight of n-octadecyl-3-(4'-hydroxy-3',5'-di-t-butylphenyl)propionate as a heat stabilizer and 0.05% by weight of calcium stearate as a hydrochloric acid absorbent.

The melt flow rate (MFR) is determined in accordance with ASTM D1238-65T under the conditions of a temperature of 190° C. and a load of 2.16 kg.

(A-iv) The flow index (FI (1/sec)) defined by a shear rate which is given when a shear stress of a molten copolymer at 190° C. reaches $2.4\times10^6$ dyne/cm$^2$ and the melt flow rate (MFR) satisfy the relation:

$$FI<150\times MFR,$$

preferably $FI<140\times MFR$, more preferably $FI<130\times MFR$.

The flow index (FI) is determined by extruding a resin from a capillary while changing a shear rate and measuring the shear rate given when the shear stress reaches the above-mentioned value. In this measurement, the same sample as described in the above-mentioned MT measurement is used, and the FI is measured under the conditions of a resin temperature of 190° C. and a shear stress of about $5\times10^4$ to $3\times10^6$ dyne/cm$^2$ using a capillary type flow property tester produced by Toyo Seiki Seisakusho K.K.

In the measurement, a diameter of the nozzle (capillary) is changed as follows depending on the MFR (g/10 min) of the resin to be measured:

in the case of MFR>20 : 0.5 mm in the case of 20≧MFR>3 : 1.0 mm in the case of 3≧MFR>0.8 : 2.0 mm, and in the case of 0.8≧MFR : 3.0 mm.

(A-v) The molecular weight distribution (Mw/Mn, Mw: weight-average molecular weight, Mn: number-average molecular weight) measured by GPC is in the range of 1.5 to 4.

The molecular weight distribution (Mw/Mn) was measured in the following manner using a measuring device of GPC-150C produced by Millipore Co.

This measurement was carried out using a column of TSK-GNEI-HT having a diameter of 72 mm and a length of 600 mm at a column temperature of 140° C. In this measurement, 500 microliters of a sample having a concentration of 0.1% by weight was introduced into the column in which o-dichlorobenzene (available from Wako Junyaku Kogyo K.K.) as a mobile phase was moved at a moving rate of 1.0 ml/min. In the mobile phase, 0.025% by weight of BHT (available from Takeda Chemical Industries, Ltd.) was contained as an antioxidant. A differential refractometer was used as a detector. With respect to the standard polystyrene of Mw<1,000 and Mw>$4\times10^6$, those available from Toso Co. were used, and with respect to the standard polystyrene of 1,000<Mw<$4\times10^6$, those available from Pressure Chemical Co. were used.

(A-vi) MT/(Mw/Mn) and FI/MFR satisfy the relation:

$$MT/(Mw/Mn)>0.03\times FI/MFR-3.0$$

with the proviso that when the value of 0.03×FI/MFR−3.0 is less than 0, it is taken as 0, preferably $$0.03\times FI/MFR+1.0>MT/(Mw/Mn)>0.03\times FI/MFR-2.8$$

with the proviso that when the value of 0.03×FI/MFR−2.8 is less than 0, it is taken as 0, more preferably $$0.03\times FI/MFR+0.8>MT/(Mw/Mn)>0.03\times FI/MFR-2.5$$

with the proviso that when the value of 0.03×FI/MFR−2.5 is less than 0, it is taken as 0.

With increase of the value of Mw/Mn, the value of MT becomes large, so that an index of MT/(Mw/Mn) is used in order to reduce an influence of the Mw/Mn value on the MT value. Likewise, with increase of the value of MFR, the value of FI becomes large, so that an index of FI/MFR is used in order to reduce an influence of the MFR value on the FI value.

(A-vii) The temperature (Tm (°C.)) at which the endothermic curve of the copolymer measured by a differential scanning calorimeter (DSC) shows the maximum peak and the density (d) satisfy the relation:

$Tm < 400 \times d - 250$, preferably $Tm < 450 \times d - 297$, more preferably $Tm < 500 \times d - 344$, particularly preferably $Tm < 550 \times d - 391$.

The temperature (Tm (°C.)) at which the endothermic curve of an ethylene/α-olefin copolymer measured by a differential scanning calorimeter (DSC) shows the maximum peak is sought from an endothermic curve obtained by filling about 5 mg of a sample in an aluminum pan, heating to 200° C. at a rate of 10° C./min, holding the sample at 200° C. for 5 minutes, lowering the temperature to room temperature at a rate of 20° C./min and then heating at a rate of 10° C./min. This measurement is carried out using a DSC-7 type apparatus produced by Perkin Elmer Co.

(A-viii) The quantity fraction (W (% by weight)) of a n-decane-soluble component at room temperature (23° C.) and the density (d) satisfy the relation:

in the case of MFR<10 g/10 min:

$W < 80 \times exp(-100(d-0.88)) + 0.1$, preferably $W < 60 \times exp(100(d-0.88)) + 0.1$, more preferably $W < 40 \times exp(-100(d-0.88)) + 0.1$, and in the case of MFR>10 g/10 min:

$W < 80 \times (MFR-9)^{0.26} \times exp(-100(d-0.88)) + 0.1$.

The measurement of the n-decane-soluble component quantity of an ethylene/α-olefin copolymer (polymer having a smaller soluble component quantity has a narrower composition distribution) is carried out by adding about 3 g of the copolymer to 450 ml of n-decane, dissolving the copolymer at 145° C., cooling the resultant solution to 23° C., removing a n-decane-insoluble portion by filtration, and recovering a n-decane-soluble portion from the filtrate.

It may be concluded that the ethylene/α-olefin copolymer which satisfies the above-mentioned relation between the temperature (Tm) at which the endothermic curve measured by a differential scanning calorimeter (DSC) shows the maximum peak and the density (d), and the relation between the quantity fraction (W) of the n-decane-soluble component and the density (d), has a narrow composition distribution.

The ethylene/α-olefin copolymers [A1] and [A2] having the above mentioned properties can be prepared by copolymerizing ethylene with an α-olefin of 3 to 20 carbon atoms in the presence of a catalyst for olefin polymerization comprising, for example, the organoaluminum oxy-compound (a) and at least two kinds of the compounds (b) of transition metal and a carrier, and if necessary, (c) an organoaluminum compound, all components being described later, in such a manner that the resultant copolymer has a density of 0.850 to 0.980 g/cm³.

[Ethylene/α-olefin copolymer [B1]]

The ethylene/α-olefin copolymer [B1] which forms the ethylene/α-olefin copolymer composition according to the invention is a random copolymer of ethylene with an α-olefin of 3 to 20 carbon atoms. Examples of the (-olefin of 3 to 20 carbon atoms employable for the copolymerization with ethylene include propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In the ethylene/α-olefin copolymer [B1], it is desired that constituent units derived from ethylene are present in an amount of 50 to 100% by weight, preferably 55 to 99% by weight, more preferably 65 to 98% by weight, most preferably 70 to 96% by weight, and constituent units derived from an α-olefin of 3 to 20 carbon atoms are present in an amount of 0 to 50% by weight, preferably 1 to 45% by weight, more preferably 2 to 35% by weight, most preferably 4 to 30% by weight.

The ethylene/α-olefin copolymer [B1] preferably has the following properties (B-i) and (B-ii), and particularly preferably has the following properties (B-i) to (B-iv).

(B-i) The density (d) is in the range of usually 0.850 to 0.980 g/cm³, preferably 0.910 to 0.960 g/cm³, more preferably 0.915 to 0.955 g/cm³, most preferably 0.920 to 0.950 g/cm³.

(B-ii) The intrinsic viscosity [η] as measured in decalin at 135° C. is in the range of usually 0.4 to 8 dl/g, preferably 0.4 to 1.25 dl/g, more preferably 0.5 to 1.23 dl/g.

(B-iii) The temperature (Tm (°C)) at which the endothermic curve of the copolymer measured by a differential scanning calorimeter (DSC) shows the maximum peak and the density (d) satisfy the relation:

$Tm < 400 \times d - 250$, preferably $Tm < 450 \times d - 297$, more preferably $Tm < 500 \times d - 344$, particularly preferably $Tm < 550 \times d - 391$.

(B-iv) The quantity fraction (W (% by weight)) of a n-decane-soluble component at room temperature (23° C.) and the density (d) satisfy the relation:

in the case of MFR ≦ 10 g/10 min:

$W < 80 \times exp(-100(d-0.88)) + 0.1$, preferably $W < 60 \times exp(-100(d-0.88)) + 0.1$, more preferably $W < 40 \times exp(-100(d-0.88)) + 0.1$, and in the case of MFR>10 g/10 min:

$W < 80 \times (MFR-9)^{0.26} \times exp(-100(d-0.88)) + 0.1$.

It may be concluded that the ethylene/α-olefin copolymer [B1] which satisfies the above-mentioned relation between the temperature (Tm) at which the endothermic curve measured by a differential scanning calorimeter (DSC) shows the maximum peak and the density (d), and the relation between the quantity fraction (W) of the n-decane-soluble component and the density (d), has a narrow composition distribution.

The ethylene/α-olefin copolymer [B1] having the above mentioned properties can be prepared by copolymerizing ethylene with an α-olefin of 3 to 20 carbon atoms in the presence of a catalyst for olefin polymerization comprising, for example, the organoaluminum oxy-compound (a), transition metal compound (b') and a carrier, and if necessary, (c) an organoaluminum compound in such a manner that the resultant copolymer has a density of 0.850 to 0.980 g/cm³.

Hereinafter, the organoaluminum oxy-compound (a), the compound (b) of a transition metal in Group IVB of the periodic table containing a ligand having a cyclopentadienyl skeleton, the compound (b') of a transition metal in Group IVB of the periodic rable containing a ligand having a cyclopentadienyl skeleton, a carrier and the organoaluminum compound (c) which are used in the preparation of ethylene/α-olefin copolymers [A1], [A2] and [B1] contained in the ethylene/α-olefin composition of the present invention are explained below.

The organoaluminum oxy-compound (a) [hereinafter sometimes referred to as "component (a)"] used in the preparation of the ethylene/α-olefin copolymers [A1], [A2] and [B1] may be a known benzene-soluble aluminoxane or the benzene-insoluble organoaluminum oxy-compound having been disclosed in Japanese Patent L-O-P No. 276807/1990.

The above-mentioned aluminoxane may be prepared, for example, by the following procedures:

(1) a procedure for recovering an aluminoxane as its hydrocarbon solution which comprises adding an organoaluminum compound such as trialkylaluminum to a suspension in a hydrocarbon medium of a compound containing adsorbed water, or a salt containing water of crystallization such as magnesium chloride hydrate, copper sulfate hydrate, aluminum sulfate hydrate, nickel sulfate hydrate and cerium chloride hydrate, and reacting the organoaluminum compound;

(2) a procedure for recovering an aluminoxane as its hydrocarbon solution which comprises reacting water, ice or steam directly with an organoaluminum compound such as trialkylaluminum in a solvent such as benzene, toluene, ethyl ether and tetrahydrofuran; and (3) a procedure for recovering an aluminoxane which comprises reacting an organotinoxide such as dimethyltinoxide and dibutyltinoxide with an organoaluminum compound such as trialkylaluminum in a solvent such as decane, benzene or toluene.

Moreover, the aluminoxane may contain a small amount of an organometal component. Furthermore, the solvent or unreacted organoaluminum compound may be removed from the above-mentioned recovered aluminoxane-containing solution, by distillation, and the aluminoxane may be redissolved in a solvent.

Concrete examples of the organoaluminum compound used for the preparation of the aluminoxane include trialkylaluminum such as trimethylaluminurn, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;

tricycloalkylaluminums such as tricyclohexylaluminum and tricyclooctylaluminum;

dialkylaluminum halides such as dimethylaluminum chloride, diethylaluminum chloride, diethylaluminum bromide and diisobutylaluminum chloride;

dialkylaluminum hydrides such as diethylaluminum hydride and diisobutylaluminum hydride;

dialkylaluminum alkoxides such as dimethylaluminum methoxide and diethylaluminum ethoxide; and dialkylaluminum aryloxides such as diethylaluminum phenoxide.

Of these compounds, trialkylaluminum and tricycloalkylaluminum are particularly preferable.

Furthermore, there may also be used as the organoaluminum compound isoprenylaluminum represented by the general formula

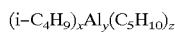

wherein x, y and z are each a positive number, and z≧2x.

The organoaluminum compounds mentioned above may be used either singly or in combination.

Solvents used for the solutions of the aluminoxane include aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosene and gas oil; and halogenated compounds derived from the above-mentioned aromatic hydrocarbons, aliphatic hydrocarbons and alicyclic hydrocarbons, especially chlorinated and brominated hydrocarbons.

In addition, there may also be used ethers such as ethyl ether and tetrahydrofuran. Of these solvents as exemplified above, aromatic hydrocarbons are particularly preferred.

The benzene-insoluble organoaluminum oxy-compounds used as component (a) contain an Al component soluble in benzene at 60° C. in an amount of not greater than 10%, preferably not greater than 5%, particularly preferably not greater than 2% in terms of Al atom, and they are insoluble or sparingly soluble in benzene.

Solubility in benzene of such organoaluminum oxy-compounds as mentioned above is obtained by suspending in 100 ml of benzene the organoaluminum oxy-compound in an amount corresponding to 100 mg atoms in terms of Al, mixing the resulting suspension at 60° C. for 6 hours with stirring, filtering the resulting mixture with a G-5 glass filter equipped with a jacket kept at 60° C., washing I times the solid portion separated on the filter with 50 ml of benzene at 60° C., and measuring the amount (x mmole) of Al atoms present in the whole filtrate.

The transtion metal compound catalyst component (b) [hereinafter sometimes referred to as "component (b)"] used in the preparation of the ethylene/α-olefin copolymers [A1] and [A2] is a compound of a transition metal in Group IVB of the periodic table which has a ligand having a cyclopentadienyl skeleton. Concretely, the component (b) is a transition metal compound represented by the following formula [b-I] or [b-II].

$$ML^1_x \qquad [b\text{-}I]$$

In the formula [b-I], M is a transition metal atom selected from Group IVB of the periodic table, $L^1$ is a ligand coordinating to the transition metal atom, at least two of $L^1$ are groups selected from a cyclopentadienyl group, a methylcyclopentadienyl group, an ethylcyclopentadienyl group and a substituted cyclopentadienyl group having at least one substituent group selected from a hydrocarbon group of 3 to 10 carbon atoms, $L^1$ other than the (substituted) cyclopentadienyl group is a hydrocarbon group of 1 to 12 carbon atoms, an alkoxy group, an aryloxy group, a trialkylsilyl group, a halogen atom or a hydrogen atom. X is a valence of the transition metal atom M.

$$ML^2_x \qquad [b\text{-}II]$$

In the formula [b-II], M is a transition metal atom selected from Group IVB of the periodic table, $L^2$ is a ligand coordinating to the transition metal atom, at least two of $L^2$ are substituted cyclopentadienyl groups having 2–5 substituent groups selected from a methyl group and an ethyl group, and $L^2$ other than the substituted cyclopentadienyl group is a hydrocarbon group of 1 to 12 carbon atoms, an alkoxy group, an aryloxy group, a trialkylsilyl group, a halogen atom or a hydrogen atom. X is a valence of the transition metal atom M.

The transition metal compounds represented by the above formula [b-I] or [b-II] are explained below in detail.

In the above formula [b-I], M is a transition metal atom selected from Group IVB of the periodic table, and it is concretely zirconium, titanium or hafnium, preferably zirconium.

$L^1$ is a ligand coordinating to the transition metal atom M, and at least two of $L^1$ are groups selected from a cyclopentadienyl group, a methylcyclopentadienyl group, an ethylcyclopentadienyl group and a substituted cyclopentadienyl group having at least one substituent group selected from a hydrocarbon group of 3 to 10 carbon atoms. Each of the ligands may be the same or different. $L^1$ other than the cyclopentadienyl group or the substituted cyclopentadienyl group is a hydrocarbon group of 1 to 12 carbon atoms, an alkoxy group, an aryloxy group, a trialkylsilyl group, a halogen atom or a hydrogen atom.

The substituted cyclopentadienyl group may have two or more of substituents. Each of substituents may be the same or different. When the substituted cyclopentadienyl has two or more of substituents, at least one substituent is a hydrocarbon group of 3 to 10 carbon atoms, and the other substituents are selected from a methyl group, an ethyl group and the hydrocarbon group of 3 to 10 carbon atoms.

Examples of the hydrocarbon group of 3 to 10 carbon atoms include alkyl group, cycloalkyl group, aryl group and aralkyl group. Concrete examples thereof include alkyl group such as n-propyl group, isopropyl group, n-butyl group, isobutyl group, sec-butyl group, t-butyl group, pentyl group, hexyl group, octyl group, 2-ethylhexyl group and decyl group; cycloalkyl group such as cyclopentyl group and cyclohexyl group; aryl group such as phenyl group and tolyl group; and aralkyl group such as benzyl group and neophyl group. Of these, preferred are alkyl groups, and particularly preferred are n-propyl group and n-butyl group.

In the present invention, the (substituted) cyclopentadienyl group coordinated to the transition metal is preferably the substituted cyclopentadienyl group, more preferably the cyclopentadienyl group substituted with alkyl group having 3 or more of carbon atoms, further preferably the substituted cyclopentadienyl group having two substituents, and particularly the 1,3-substituted cyclopentadienyl group.

In the above-mentioned formula [b-I], ligand $L^1$ other than the cyclopentadienyl group or the substituted cyclopentadienyl group is a hydrocarbon group of 1 to 12 carbon atoms, an alkoxy group, an aryloxy group, a trialkylsilyl group, a halogen atom or a hydrogen atom.

Examples of the hydrocarbon group of 1 to 12 carbon atoms include alkyl group, cycloalkyl group, aryl group and aralkyl group. Concrete examples thereof include alkyl group such as methyl group, ethyl group, n-propyl group, isopropyl group, n-butyl group, isobutyl group, sec-butyl group, t-butyl group, pentyl group, hexyl group, octyl group, 2-ethylhexyl group and decyl group; cycloalkyl group such as cyclopentyl group and cyclohexyl group; aryl group such as phenyl group and tolyl group; and aralkyl group such as benzyl group and neophyl group.

Examples of the alkoxy group include methoxy group, ethoxy group, n-propoxy group, isopropoxy group, n-butoxy group, isobutoxy group, sec-butoxy group, t-butoxy group, pentoxy group, hexoxy group and octoxy group.

Examples of the aryloxy group include phenoxy group and the like.

Examples of the trialkylsilyl group include trimethylsilyl group, triethylsilyl group and triphenylsilyl group.

Examples of the halogen atom include fluorine, chlorine, bromine and iodine.

Listed below are examples of the transition metal compound represented by the formula [b-I].

Bis(cyclopentadienyl)zirconium dichloride,
Bis(methylcyclopentadienyl)zirconium dichloride,
Bis(ethylcyclopentadienyl)zirconium dichloride,
Bis(n-propylcyclopentadienyl)zirconium dichloride,
Bis(n-butylcyclopentadienyl) zirconium dichloride,
Bis(n-hexylcyclopentadienyl)zirconium dichloride,
Bis(methyl-n-propylcyclopentadienyl)zirconium dichloride,
Bis(methyl-n-butylcyclopentadienyl)zirconium dichloride,
Bis(dimethyl-n-butylcyclopentadienyl)zirconium dichloride,
Bis(n-butylcyclopentadienyl)zirconium dibromide,
Bis(n-butylcyclopentadienyl)zirconium methoxychloride,
Bis(n-butylcyclopentadienyl)zirconium ethoxychloride,
Bis(n-butylcyclopentadienyl)zirconium butoxychloride,
Bis(n-butylcyclopentadienyl)zirconium diethoxide,
Bis(n-butylcyclopentadienyl)zirconium methylchloride
Bis(n-butylcyclopentadienyl)zirconium diethyl,
Bis(n-butylcyclopentadienyl)zirconium benzylchloride,
Bis(n-butylcyclopentadienyl)zirconium dibenzyl,
Bis(n-butylcyclopentadienyl)zirconium phenylchloride, and
Bis(n-butylcyclopentadienyl)zirconium hydride chloride.

In the above exemplified compounds, di-substituted cyclopentadienyl include 1,2- and 1,3-substituted, and tri-substituted include 1,2,3- and 1,2,4-substitulted. Also employable in the invention are transition metal compounds obtained by substituting titanium metal or hafnium metal for the zirconium metal in the above-exemplified zirconium compounds.

Of the above-exemplified transition metal compounds represented by the formula [b-I], particularly preferred are Bis(n-propylcyclopentadienyl)zirconium dichloride, Bis(n-butylcyclopentadienyl)zirconium dichloride, Bis(1-methyl-3-n-propylcyclopentadienyl)zirconium dichloride and Bis (1-methyl-3-n-butylcyclopentadienyl)zirconium dichloride.

In the above-mentioned formula [b-II], M is a transition metal selected from Group IVB of the periodic table, and concrete preferable examples Of M include zirconium, titanium and hafnium. Of these, particularly preferred is zirconium.

$L^2$ is a ligand coordinated to the transition metal, and at least two of them are substituted cyclopentadienyl groups having 2–5 Of substituents selected from a methyl group and an ethyl group. Each of ligands may be the same or different. The substituted cyclopentadienyl groups are the substituted cyclopentadienyl groups having 2 or more of substituents, preferably the substituted cyclopentadienyl groups having 2 or 3 of substituents, more preferably the substituted cyclopentadienyl groups having two substituents, particularly the 1,3-substituted cyclopentadienyl groups. Each of substituent may be the same or different.

In the above-mentioned formula [b-II], ligand $L^2$ other than the substituted cyclopentadienyl group is a hydrocarbon group of 1 to 12 carbon atoms, an alkoxy group, an aryloxy group, a trialkylsilyl group, a halogen atom or a hydrogen atom as similar to the ligand $L^1$ in the above-mentioned formula [b-I].

The transition metal compound represented by the general formula [b-II] include, for example,
Bis(dimethylcyclopentadienyl)zirconium dichloride,
Bis(diethylcyclopentadienyl)zirconium dichloride,
Bis(methylethylcyclopentadienyl)zirconium dichloride,
Bis(dimethylethylcyclopentatienyl)zirconium dichloride, Bis(dimethylcyclopentadienyl)zirconium dibromide,
Bis(dimethylcyclopentadienyl)zirconium methoxychloride,
Bis(dimethylcyclopentadienyl)zirconium ethoxychloride,
Bis(dimethylcyclopentadienyl)zirconium butoxychloride,
Bis(dimethylcyclopentadienyl)zirconium diethoxide,
Bis(dimethylcyclopentadienyl)zirconium methylchloride,
Bis(dimethylcyclopentadienyl)zirconium dimethyl,
Bis(dimethylcyclopentadienyl)zirconium benzylchloride,
Bis(dimethylcyclopentadienyl)zirconium dibenzyl,
Bis(dimethylcyclopentadienyl)zirconium phenylchloride,
and Bis(dimethylcyclopentadienyl)zirconium hydride chloride.

In the above exemplified compounds, di-substituted cyclopentadienyl include 1,2- and 1,3-substituted, and tri-substituted include 1,2,3- and 1,2,4-substituted.

There may also be used transition metal compounds obtained by substituting titanium or hafnium for zirconium in the above-exemplified zirconium compounds.

In the above-mentioned transition metal compounds represented by the general formula [b-II], particularly preferred is
Bis(1,3-dimethylcyclopentadienyl)zirconium dichloride,
Bis(1,3-diethylcyclopentadienyl)zirconium dichloride, or
Bis(1-methyl-3-ethylcyclopentadienyl)zirconium dichloride.

In the invention, it is preferred to use a combination of at least one kind of a transition metal compound represented by the above formula [B-I] and at least one kind of a transition metal compound represented by the above formula [b-II] as the transition metal compound (b). In concrete, preferably used are a combination of bis(1,3-n-butylmethylcyclopentadienyl)zirconium dichloride and bis(1,3-dimethylcyclopentadienyl)zirconium dichloride, a combination of bis(1,3-n-propylmethylcyclopentadienyl) zirconium dichloride and bis(1,3-dimethylcyclopentadienyl) zirconium dichloride, and a combination of bis(n-butylcyclopentadienyl)zirconium dichloride and bis(1,3-dimethylcyclopentadienyl)zirconium dichloride.

The above-mentioned at least-one kind of a transition metal compound (b-I) represented by the formula [b-I] and at least one kind of a transition metal compound (b-II) represented by the formula [b-II] are desirably used in such amounts that the molar ratio [(b-I)/(b-II)] is in the range of 99/1 to 50/50, preferably 97/3 to 70/30, more preferably 95/5 to 75/25, most preferably 90/10 to 80/20.

A transition metal compound catalyst component containing at least one kind of a transition metal compound (b-I) represented by the formula [b-I] and at least one kind of a transition metal compound (b-II) represented by the formula [b-II] is sometimes referred to as "component (b)" hereinafter.

The compound (b') (hereinafter called "component (b')" in some cases) of the IVB group transition metal of the periodic table which contains a ligand having a cyclopentadienyl skeleton used in the preparation the ethylene/α-olefin copolymer [B1] in the invention is no way limited as far as it is a compound of a transition metal in Group IV of the periodic table which contains a ligand having a cyclopentadienyl skeleton. However, the component (b') is preferably a transition compound represented by the following formula [b-III].

$$ML_x \qquad \text{[b-III]}$$

wherein M is a transition metal atom selected from Group IVB of the periodic table, L is a ligand coordinating to the transition metal, at least one of L is a ligand having a cyclopentadienyl skeleton, and L other than the ligand having a cyclopentadienyl skeleton is a hydrocarbon group of 1–12 carbon atoms, an alkoxy group, an aryloxy group, an aryloxy group, a trialkylsilyl group, $SO_3R$ group (provided that R is a hydrocarbon group which may have such a substituent as halogen), halogen atom or hydrogen atom, and x is a valence of the transition metal atom.

The transition metal compound represented by the above formula [b-III] include the transition metal compound (b-I) represented by the above formula [b-I] and the transition metal compound (b-II) represented by the above formula [b-II].

In the above-mentioned formula [b-III], M is a transition metal selected from Group IVB of the periodic table, and concrete preferable examples of M include zirconium, titanium and hafnium. Of these, particularly preferred is zirconium.

The ligands having a cyclopentadienyl skeleton are, for example, cyclopentadienyl group, alkyl-substituted cyclopentadienyl groups such as methylcyclopentadienyl, dimethylcyclopentadienyl, trimethylcyclopentadienyl, tetramethylcyclopentadienyl, pentamethylcyclopentadienyl, ethylcyclopentadienyl, methylethylcyclopentadienyl, propylcyclopentadienyl, methylpropylcyclopentadienyl, butylcyclopentadienyl, methylbutylcyclopentadienyl and hexylpentadienyl, or indenyl group, 4,5,6,7-tetrahydroindenyl group and fluorenyl group. These groups as exemplified above may be substituted with a halogen atom or trialkylsilyl group.

Of the ligands coordinating with the transition metal atom, particularly preferred is an alkyl-substituted cyclopentadienyl group.

When the compound represented by the general formula [b-III] contains 2 or more ligands each having a cyclopentadienyl skeleton, the two ligands out of those having a cyclopentadienyl skeleton may be linked together through an alkylene group such as ethylene or propylene, a substituted alkylene group such as isopropylidene or diphenylmethylene, a silylene group or a substituted silylene group such as dimethylsilylene, diphenylsilylene or methylphenylsilylene.

The ligands L other than those having a cyclopentadienyl skeleton may include those mentioned below.

The hydrocarbon group of 1–12 carbon atoms includes such group as alkyl, cycloalkyl, aryl or aralkyl, and more particularly, the alkyl group includes methyl, ethyl, propyl, isopropyl or butyl; the cycloalkyl group includes cyclopentlyl or cyclohexyl; the aryl group includes phenyl or tolyl; and the aralkyl group includes benzyl or neophyl.

Further, the alkoxy group includes methoxy, ethoxy or butoxy; aryloxy group includes phenoxy; the ligand represented by $SO_3R$ includes p-toluenesulfonate, methanesulfonate or trifluoromethanesulfonate; and the halogen includes fluorine, chlorine, bromine or iodine.

When the valence of the transition metal atom is, for example, 4, the transition metal compound (b') containing ligands having a cyclopentadienyl skeleton is represented by the following formula [b-III'] in more detail.

$$R^2{}_k R^3{}_l R^4{}_m R^5{}_n M \qquad \text{[b-III']}$$

wherein M represents the same transition metal atom as in the formula [b-III], $R^2$ represents a group (ligand) having a cyclopentadienyl skeleton, $R^3$, $R^4$ and $R^5$ each represent a group having a cyclopentadienyl skeleton, alkyl group, cycloalkyl group, aryl group, aralkyl group, alkoxyl group, aryloxy group, trialkylsilyl group, $SO_3R$ group, halogen atom or hydrogen atom, k is an integer of 1 or more, and k+l+m+n=4.

In the present invention, there is used preferably a metallocene compound having the above-mentioned formula [b-III'] in which at least two of $R^2$, $R^3$, $R^4$ and $R^5$ are the groups (ligands) having a cyclopentadienyl skeleton, for example, $R^2$ and $R^3$ are the groups (ligands) having a cyclopentadienyl.

The groups having a cyclopentadienyl skeleton mentioned above may be linked together through an alkylene group such as ethylene or propylene, a substituted alkylene group such as isopropylene or diphenylmethylene, a silylene group or a substituted silylene group such as dimethylsilylene, diphenylsilylene or methylphenylsilylene.

Further, $R^4$ and $R^5$ in the above-mentioned formula [b-III'] are each a group having a cyclopentadienyl skeleton, alkyl group, cycloalkyl group, aryl group, arlakyl group, alkoxyl group, aryloxy group, trialkylsilyl group, $SO_3R$ group, halogen atom or hydrogen atom.

Exemplified below are the transition metal compounds (b') of the formula [b-III'] wherein M is zirconium.

Bis(indenyl)zirconium dichloride,
Bis(indenyl)zirconium dibromide,
Bis(indenyul)zirconium bis(p-toluenesulfonate),
Bis(4,5,6,7-tetrahydroindenyl)zirconium dichloride,
Bis(fluorenyl)zirconium dichloride,
Ethylenebis(indenyl)zirconium dichloride,
Ethylenebis(indenyl)zirconium dibromide,
Ethylenebis(indenyl)dimethylzirconium,
Ethylenebis(indenyl)diphenylzirconium,
Ethylenebis(indenyl)methylzirconium monochloride,
Ethylenebis(indenyl)zirconium bis(methanesulfonate),
Ethylenebis(indenyl)zirconium bis(p-toluenesulfonate),
Ethylenebis(indenyl) zirconium bis(trifluoromethanesulfonate),
Ethylenebis(4,5,6,7-tetrahydroindenyl)zirconium dichloride,
Isopropylidene(cyclopentadienyl-fluorenyl)zirconium dichloride,
Isopropylidene(cyclopentadienyl-methylcyclopentadienyl) zirconium dichloride,
Dimethylsilylenebis(cyclopentadienyl)zirconium dichloride,
Dimethylsilylenebis(methylcyclopentadienyl)zirconium dichloride,
Dimethylsilylenebis(dimethylcyclopentadienyl) zirconium dichloride,
Dimethylsilylenebis(trimethylcyclopentadienyl) zirconium dichloride,
Dimethylsilylenebis(indenyl)zirconium dichloride,
Dimethylsilylenebis(indenyl)zirconium bis (trifluoromethane-sulfonate),
Dimethylsilylenebis(4,5,6,7-tetrahydroindenyl)zirconium dichloride,
Dimethylsilylene(cyclopentadienyl-fluorenyl)zirconium dichloride,
Diphenylsilylenebis(indenyl)zirconium dichloride,
Methylphenylsilylenebis(indenyl)zirconium dichloride,
Bis(cyclopentadienyl)zirconium dichloride,
Bis(cyclopentadienyl)zirconium dibromide,
Bis(cyclopentadienyl)methylzirconium monochloride,
Bis(cyclopentadienyl)ethylzirconium monochloride,
Bis(cyclopentadienyl)cyclohexylzirconium monochloride,
Bis(cyclopentadienyl)phenylzirconium monochloride,
Bis(cyclopentadienyl)benzylzirconium monochloride,
Bis(cyclopentadienyl)zirconium monochloride monohydride,
Bis(cyclopentadienyl)methylzirconium monohydride,
Bis(cyclopentadienyl)dimethylzirconium,
Bis(cyclopentadienyl)diphenylzirconium,
Bis(cyclopentadienyl)dibenzylzirconium,
Bis(cyclopentadienyl)zirconium methoxychloride,
Bis(cyclopentadienyl)zirconium ethoxychloride,
Bis(cyclopentadienyl)zirconium bis(methanesulfonate),
Bis(cyclopentadienyl)zirconium bis(p-toluenesulfonate),
Bis(cyclopentadienyl)zirconium bis (trifluoromethanesulfonate),
Bis(methylcyclopentadienyl)zirconium dichloride,
Bis(dimethylcyclopentadienyl)zirconium dichloride,
Bis(dimethylcyclopentadienyl)zirconium ethoxychloride,
Bis(dimethylcyclopentadienyl)zirconium bis (trifluoromethanesulfonate),
Bis(ethylcylopentadienyl)zirconium dichloride,
Bis(methylethylcyclopentadienyl)zirconium dichloride,
Bis(propylcyclopentadienyl)zirconium dichloride,
Bis(methylpropylcyclopentadienyl)zirconium dichloride,
Bis(butylcylopentadienyl)zirconium dichloride,
Bis(methylbutylcyclopentadienyl)zirconium dichloride,
Bis(methylbutylcyclopentadienyl)zirconium bis (methanesulfonate),
Bis(trimethylcyclopentadienyl)zirconium dichloride,
Bis(tetramethylcyclopentadienyl)zirconium dichloride,
Bis(pentamethylcyclopentadienyl)zirconium dichloride,
Bis(hexylcyclopentadienyl)zirconium dichloride, and
Bis(trimethylsilylcyclopetnadienyl)zirconium dichloride.

In the compounds exemplified above, the di-substituted cyclopentadienyl ring includes 1,2- and 1,3-substituted compounds, and the tri-substituted cyclopentadienyl ring includes 1,2,3- and 1,2,4-substituted compounds. Further, the alkyl group such as propyl or butyl includes isomer such as n-, i-, sec-, tert-compounds, In the present invention, the above-exemplified zirconium compounds in which the zirconium has been replaced by titanium or hafnium can also be used as the transition metal compounds.

The carrier used in the preparation of the ethylene/α-olefin copolymers [A1], [A2] and [B1] in present invention is a solid inorganic or organic compound in granules or fine particles having a particle size of 10 to 300 μm, preferably 20 to 200 μm. Of these carriers, porous oxides are preferable as inorganic carriers. Concrete examples of the oxide carriers include $SiO_2$, $Al_2O_3$, $MgO$, $ZrO_2$, $TiO_2$, $B_2O_3$, $CaO$, $ZnO$, $BaO$, $ThO_2$, or a mixture of these compounds such as $SiO_2$—$MgO$, $SiO_2$—$Al_2O_3$, $SiO_2$—$TiO_2$, $SiO_2$—$V_2O_5$, $SiO_2$—$Cr_2O_3$ and $SiO_2$—$TiO_2$—$MgO$. Of these carriers, preferred are those comprising at least one compound selected from the group consisting of $SiO_2$ and $Al_2O_3$ as a major component.

Furthermore, the above-mentioned inorganic oxide or oxides may also contain a small amount of a carbonate, a sulfate, a nitrate and an oxide such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $LiO_2$.

Though the carriers have different properties among them depending on the types and preparation methods thereof, the carriers preferably used in the invention have a specific surface area of 50 to 1000 $m^2/g$, preferably 100 to 700 $m^2/g$, a pore volume of desirably 0.3 to 2.5 $cm^2/g$. The carriers are prepared if necessary by firing at a temperature of 100 to 1000° C., preferably 150 to 700° C.

It is also desirable that this carrier has an amount of adsorbed water of less than 1.0% by weight, preferably less than 0.5% by weight, and a surface hydroxyl group in an amount of 1.0% by weight or more, preferably 1.5–4.0% by weight and especially 2.0–3.5% by weight.

The amount of adsorbed water (% by weight) and that of the surface hydroxyl group (% by weight) are obtained by the following procedures.

(Amount of adsorbed water)

The specimen is dried at a temperature of 200° C., an ordinary pressure and in a nitrogen stream for 4 hours to measure a weight loss which is then taken as the amount of adsorbed water.

(Surface hydroxyl group)

The weight measured by drying the carrier at a temperature of 200° C., an ordinary pressure in a nitrogen stream for 4 hours is taken as X (g), and the carrier as dried is then calcined at a temperature of 1,000° C. for 20 hours to obtain a calcined product from which the surface hydroxyl groups have disappeared, and the weight of the calcination product as measured is taken as Y (g). The amount of the surface hydroxyl groups is calculated on the basis of the following equation.

Surface hydroxyl group (wt %)=[(X−Y)/X]×100

Moreover, there can be mentioned organic compounds in solid granules or fine solid particles each having a particle size of 10 to 300 μm as carriers which can be used as the carrier in the present invention. Examples of these organic compounds include (co)polymers containing as the main component constituent units derived from an α-olefin of 2 to 14 carbon atoms, such as ethylene, propylene, 1-butene and 4-methyl-1-pentene, or polymers or copolymers containing as the main component constituent units derived from vinylcyclohexane or styrene.

Though the catalyst for preparing the ethylene/α-olefin copolymers [A1] and [A2] is formed from the organoaluminum oxy-compound (a), at least two kinds of the transition metal compounds (b) and the carrier, and the catalyst for preparing the ethylene/α-olefin copolymer [B1] is formed from the organoaluminum oxy-compound (a), the transition metal compound (b') and the carrier, each catalyst may, if necessary, contain an organoaluminum compound (c).

Examples of the organoaluminum compound (c) [hereinafter sometimes referred to as "component (c)"] include an organoaluminum compound represented by the following formula [IV].

$$R^1_n AlX_{3-n} \qquad [IV]$$

wherein $R^1$ is a hydrocarbon group of 1 to 12 carbon atoms, X is a halogen atom or a hydrogen atom, and n is 1 to 3.

In the above formula [IV], $R^1$ is a hydrocarbon group of 1 to 12 carbon atoms, for example, an alkyl group, a cycloalkyl group Bar an aryl group. Concrete examples of $R^1$ include methyl, ethyl, n-propyl, isopropyl, isobutyl, pentyl, hexyl, octyl, cyclopentyl, cyclohexyl, phenyl and tolyl.

Concrete examples of such organoaluminum compounds (c) include trialkylaluminum such as trimethylaluminum, triethylaluminum, triisopropylaluminum, triisobutylaluminum, trioctylaluminum and tri-2-ethylhexylaluminum;

alkenylaluminum such as isoprenylaluminum;

dialkylaluminum halides such as dimethylaluminum chloride, diethylaluminum chloride, diisopropylaluminum chloride, diisobutylaluminum chloride and dimethylaluminum bromide;

alkylaluminum sesquihalides such as methylaluminum sesquichloride, ethylaluminum sesquichloride, isopropylaluminum sesquichloride, butylaluminum sesquichloride and ethylaluminum sesquibromide;

alkylaluminum dihalides such as methylaluminum dichloride, ethylaluminum dichloride, isopropylaluminum dichloride and ethylaluminum dibromide; and alkylaluminum hydrides such as diethylaluminum hydride and diisobutylaluminum hydride. furthermore, there may also be used other organoaluminum compounds represented by the following formula [V] as the organoaluminum compound catalyst component (c)

$$R^1_n AlY_{3-n} \qquad [V]$$

wherein $R^1$ is as defined previously, Y is —$OR^2$, —$OSiR^3_3$, —$OAlR^4_2$, —$NR^5_2$, —$SiR^6_3$ or —$N(R^7)AlR^8_2$, n is 1 to 2, $R^2$, $R^3$, $R^4$ and $R^8$ are each methyl, ethyl, isopropyl, isobutyl, cyclohexyl or phenyl, $R^5$ is hydrogen, methyl, ethyl, isopropyl, phenyl or trimethylsilyl, $R^6$ and $R^7$ are each methyl or ethyl.

The organoaluminum compounds as mentioned above include, in concrete, such compounds as enumerated below.

(1) Compounds of the formula $R^1_n Al(OR^2)_{3-n}$ such as dimethylaluminum methoxide, diethylaluminum ethoxide and diisobutylaluminum methoxide.

(2) Compounds of the formula $R^1_n Al(OSiR^3_3)_{3-n}$ such as $Et_2Al(OSiMe_3)$, $(iso-Bu)_2Al(OSiMe_3)$ and $(iso-Bu)_2Al(OSiEt_3)$ (3) Compounds of the formula $R^1_n Al(OAlR^4_2)_{3-n}$ such as $Et_2AlOAlEt_2$ and $(iso-Bu)_2AlOAl(iso-Bu)_2$.

(4) Compounds of the formula $R^1_n Al(NR^5_2)_{3-n}$ such as $Me_2AlNEt_2$, $Et_2AlNHMe$, $Me_2AlNHEt$, $Et_2AlN(SiMe_3)_2$, $(iso-Bu)_2AlN(SiMe_3)_2$ (5) Compounds of the formula $R^1_n Al(SiR^6_3)_{3-n}$ such as $(iso-Bu)_2AlSiMe_3$.

(6) Compounds of the formula $$R^1_n Al(NAlR^8_2)_{3-n} \atop | \atop R^7$$

such as $$Et_2AlNAlEt_2 \quad \text{and} \quad (iso-Bu)_2AlNAl(iso-Bu)_2. \atop | \qquad\qquad\qquad\qquad | \atop Me \qquad\qquad\qquad\qquad Et$$

Of the organoaluminum compounds as exemplified above, preferred are those having the formulas $$R^1_3Al, \ R^1_n Al(OR^2)_{3-n} \text{ and } R^1_n Al(OAlR^4_2)_{3-n},$$

and particularly preferred are those having the above-mentioned formulas in which R is isoalkyl and n is 2.

In the preparation of the ethylene/α-olefin copolymers [A1] and [A2], a solid catalyst (1) prepared by contacting the component (a), the component (b) and the carrier, and if necessary the component (c), is preferably used. The contact between the components (a) to (c) and the carrier may be conducted in an arbitrarily selected order, but preferably the carrier is first contacted with the component (a), then with the component (b) and if necessary with the component (c). Further, it is preferred that at least two kinds of the transition metal compounds are beforehand mixed to form the component (b) and then the component (b) is contacted with other components.

The contact between the components (a) to (c) and the carrier can be carried out in an inert hydrocarbon solvent. Concrete examples of the inert hydrocarbon solvent used for preparing the catalyst include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures thereof.

When the component (a), the component (b) and the carrier, and if necessary, the component (c) are mixed and contacted, the component (b) is used in an amount of usually $5 \times 10^{-6}$ to $5 \times 10^{-4}$ mol, preferably $10^{-5}$ to $2 \times 10^{-4}$ mol, per 1 g of the carrier, and the concentration of the component (b) is in the range of about $10^{-4}$ to $2 \times 10^{-2}$ mol/l (solvent), preferably $2 \times 10^{-4}$ to $10^{-2}$ mol/l (solvent). An atomic ratio (Al/transition metal) of the aluminum atom (Al) in the component (a) to the transition metal in the component (b) is in the range of usually 10 to 500, preferably 20 to 200. An atomic ratio (Al-c/Al-a) of the aluminum atom (Al-c) in the component (c) which is optionally used to the aluminum atom (Al-a) in the component (a) is in the range of usually 0.02 to 3, preferably 0.05 to 1.5. The temperature for contacting the component (a), the component (b) and the carrier, and if necessary the component (c), is in the range of usually $-50°$ to $150°$ C., preferably $-20°$ to $120°$ C., and the period of time therefor is in the range of 1 minute to 50 hours, preferably 10 minutes to 25 hours.

In the preparation of the ethylene/α-olefin copolymer [B1], a solid catalyst (2) prepared by contacting the component (a) the component (b') and the carrier, and if necessary the component (c), is preferably used. The solid 1 5 catalyst can be prepared in a manner similar to that for the solid catalyst (1) used for preparing the above-mentioned ethylene/α-olefin copolymers [A1] and [A2].

In the solid catalyst (1) used for the preparation of the ethylene/α-olefin copolymers [A1] and [A2] or in the the solid catalyst (2) used for the preparation of the ethylene/α-olefin copolymer [B1], the transition metal atom derived from the component (b) (or the component (b')) is desirably supported in an amount of $5 \times 10^{6}$ to $5 \times 10^{-4}$ g·atom, preferably $10^{5}$ to $2 \times 10^{-4}$ g·atom, per 1 g of the carrier, and the aluminum atom derived from the component (a) and the component (c) is desirably supported in an amount of $10^{-3}$ to $5 \times 10^{-2}$ g·atom, preferably $2 \times 10^{-3}$ to $2 \times 10^{-2}$ g·atom, per 1 g of the carrier.

The catalyst for olefin polymerization used for the preparation of the ethylene/α-olefin copolymers [A1] and [A2] may be a prepolymerized catalyst obtained by prepolymerizing an olefin in the presence of the component (a), the component (b), the carrier and if necessary the component (c). The prepolymerization can be carried out by introducing an olefin into an inert hydrocarbon solvent in the presence of the component (a), the component (b), the carrier and if necessary the component (c), or in the presence of the solid catalyst component (1) prepared by contacting the component (a), the component (b), the component (c) and if necessary the component (c)

Examples of the olefins employable for the prepolymerization include ethylene, and α-olefins having 3 to 20 carbon atoms such as propylene, 1-butene, 1-pentene, 4-methyl-1-pentene, 1-hexene, 1-octene, 1-decene, 1-dodecene and 1-tetradecene. Of these, particularly preferred is ethylene or a combination of ethylene and the same α-olefin as used for the polymerization.

In the prepolymerization, the component (b) is used in an amount of usually $10^{-6}$ to $2 \times 10^{-2}$ mol/l (solvent), preferably $5 \times 10^{-5}$ to $10^{-2}$ mol/l (solvent). Further, the component (b) is used in an amount of usually $5 \times 10^{-6}$ to $5 \times 10^{-4}$ mol, preferably $10^{-5}$ to $2 \times 10^{-4}$ mol, per 1 g of the carrier. An atomic ratio (Al/transition metal) of the aluminum atom (Al) in the component (a) to the transition metal in the component (b) is in the range of usually 10 to 500, preferably 20 to 200. An atomic ratio (Al-c/Al-a) of the aluminum atom (Al-c) in the component (c) which is optionally used to the aluminum atom (Al-a) in the component (a) is in tile range of usually 0.02 to 3, preferably 0.05 to 1.5.

The solid catalyst component (1) is used in an amount of usually $10^{-6}$ to $2 \times 10^{-2}$ mol/l (solvent), preferably $5 \times 10^{-5}$ to $10^{-2}$ mol/l (solvent), in terms of the transition metal atom derived from the transition metal compound in the solid catalyst component.

The temperature for the prepolymerization is in the range of $-20°$ to $80°$ C., preferably $0°$ to $60$ ° C, and the period of time therefor is in the range of 0.5 to 100 hours, preferably 1 to 50 hours.

The prepolymerization may be carried out either batchwise or continuously, and may be carried out under reduced pressure, atmospheric pressure or application of pressure. In the prepolymerization, hydrogen is desirably allowed to exist to obtain a prepolymer having an intrinsic viscosity [η], as measured in decalin at 135° C., of 0.2 to 7 dl/g, preferably 0.5 to 5 dl/g.

It is desired that an olefin polymer is prepared by the prepolymerization in an amount of 0.1 to 500 g, preferably 0.2 to 300 g, more preferably 0.5 to 200 g, per 1 g of the carrier.

The prepolymerized catalyst (1) can be prepared, for example, in the following manner. First, the carrier is suspended in an inert hydrocarbon to give a suspension. To the suspension is added the organoaluminum oxy-compound (component (a)) to perform reaction for a predetermined time. Then, a supernatant liquid is removed, and the resultant solid component is again suspended in an inert hydrocarbon. Subsequently, to the system are added the transition metal compound (component (b)) to perform reaction for a predetermined time. A supernatant liquid is removed again to obtain a solid catalyst component. The solid catalyst component thus obtained is added to an inert hydrocarbon containing the organoaluminum compound (component (c)), followed by introducing an olefin, to obtain the prepolymerized catalyst.

The catalyst for olefin polymerization used for preparing the ethylene/α-olefin copolymer [B1] may be a prepolymerized catalyst (2) obtained by prepolymerizing an olefin in the presence of the component (a), the component (b'), the carrier and if necessary the component (c).

Similarly to the above-mentioned prepolymerized catalyst (1), the prepolymerized catalyst (2) can be prepared by introducing an olefin into an inert hydrocarbon solvent in the presence of the component (a), the component (b'), the carrier and if necessary the component (c), or in the presence of a solid catalyst component (2) prepared by contacting the component (a), the component (b), the component (c) and if necessary the component (c).

In the prepolymerized catalyst (1) (or the prepolymerized catalyst (2)), it is desired that the component (b) (or the component (b')) is supported in an amount of about $5 \times 10^{-6}$ to $5 \times 10^{-4}$ g·atom, preferably $10^{-5}$ to $2 \times 10^{-4}$ g·atom, in terms of the transition metal atom, per 1 g of the carrier; and the aluminum atom (Al) derived from the component (a) and the component (c) is supported in such an amount that the molar ratio (Al/M) of the aluminum atom (Al) derived from the component (a) and the component (c) to the transition metal atom (M) derived from the component (1)) (or the component (b')) is in the range of 5 to 200, preferably 10 to 150.

The ethylene/α-olefin copolymers [A1] and [A2] for forming the ethylene copolymer composition of the invention can be obtained by copolymerizing ethylene with an α-olefin of 3 to 20 carbon atoms such as propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene, in the presence of, for example, the aforesaid catalyst for olefin polymerization comprising the component (a), the component (b) and the carrier.

Tile ethylene/α-olefin copolymer [B1] can be obtained by copolymerizing ethylene with such an α-olefin of 3 to 20 carbon atoms as mentioned above, in the presence of, for example, the aforesaid catalyst for olefin polymerization comprising the component (a), the component (b') and the carrier.

In the invention, the copolymerization of ethylene with the α-olefin is carried out either in a gas phase or in a liquid phase such as slurry. In the slurry polymerization, an inert hydrocarbon may be used as a solvent, or the olefin itself may be used as a solvent.

Examples of the inert hydrocarbon solvent used for the slurry polymerization include aliphatic hydrocarbons, such as propane, butane, isobutane, pentane, hexane, octane, decane, dodecane, hexadecane and octadecane; alicyclic hydrocarbons, such as cyclopentane, methylcyclopentane, cyclohexane and cyclooctane; aromatic hydrocarbons, such as benzene, toluene and xylene; and petroleum fractions, such as gasoline, kerosine and gas oil. Of these, preferred are aliphatic hydrocarbons, alicyclic hydrocarbons and petroleum fractions.

In the slurry polymerization or the gas phase polymerization, the above-described catalyst is used in such an amount that the concentration of the transition metal atom in the polymerization reaction system is in the range of usually $10^{-18}$ to $10^{-3}$ g·atom/l, preferably $10^{-7}$ to $10^{-4}$ g·atom/l.

In the polymerization, an organoaluminum oxy-compound which is the same as the component (a) and/or the organoaluminum compound (c) may be added. In this case, the atomic ratio (Al/M) of the aluminum atom (Al) derived from the organoaluminum oxy-compound and the organoaluminum compound to the transition metal atom (M) derived from the transition metal compound (b) (or the transition metal compound (b')) is in the range of 5 to 300, preferably 10 to 200, more preferably 15 to 150.

In the invention, the temperature for the slurry polymerization is in the range of usually −50° to 100° C., preferably 0° to 90° C., while the temperature for the gas phase polymerization is in the range of usually 0° to 120° C., preferably 20° to 100° C.

The polymerization pressure is in the range of usually atmospheric pressure to 100 kg/cm², preferably 2 to 50 kg/cm². The polymerization may be carried out batchwise, semi-continuously or continuously.

[Ethylene/α-olefin copolymer composition]

The first ethylene/α-olefin copolymer composition according to the invention comprises the ethylene/α-olefin copolymer [A1] and the ethylene/α-olefin copolymer [B1]. In this composition, it is desired that the ethylene/α-olefin copolymer [A1] is contained in an amount of 20 to 90 % by weight, preferably 40 to 75% by weight, and the ethylene/α-olefin copolymer [B1] is contained in an amount of 10 to 80% by weight, preferably 25 to 60% by weight. The ethylene/α-olefin copolymer [A1] and the ethylene/α-olefin copolymer [B1] are different from each other.

The ethylene/α-olefin copolymers [A1] and [B1] are used in an appropriate combination so that the ratio ([A1]/[B1]) in the density of the ethylene/α-olefin copolymer [A1] to the ethylene/α-olefin copolymer [B1] is preferably less than 1, more preferably in the range of 0.930 to 0.999.

The second ethylene/α-olefin copolymer composition according to the invention comprises the ethylene/α-olefin copolymer [A2] and the ethylene/α-olefin copolymer [B1].

In this composition, it is desired that the ethylene/α-olefin copolymer [A2] is contained in an amount of 20 to 90% by weight, preferably 40 to 75% by weight, and the ethyene/α-olefin copolymer [B1] is contained in an amount of 10 to 80% by weight, preferably 25 to 60% by weight. The ethylene/α-olefin copolymer [A2] and the ethylene/α-olefin copolymer [B1] are different from each other.

The ethylene/α-olefin copolymers [A2] and [B1] are used in an appropriate combination so that the ratio ([A2]/[B1]) in the density of the ethylene/α-olefin copolymer [A2] to the ethylene/α-olefin copolymer (B1) is preferably less than 1, more preferably in the range of 0.930 to 0.999.

The ethylene/α-olefin copolymer composition preferably has the following properties (ii) to (vii).

(ii) The density (d) is in the range of usually 0.850 to 0.980 g/cm³, preferably 0.890 to 0.955 g/cm³, more preferably 0.900 to 0.950 g/cm³.

(iii) The melt flow rate (MFR) under the conditions of a temperature of 190° C. and a load of 2.16 kg is in the range of usually 0.1 to 100 g/10 min, preferably 0.2 to 50 g/10 min.

(iv) The melt tension (MT (g)) at 190° C. and the melt flow rate (MFR) satisfy the relation:

$$MT \geq 2.2 \times MFR^{-0.84}.$$

(v) The flow index (FI (1/sec)) defined by a shear rate which is given when a shear stress at 190° C. reaches $2.4 \times 10^6$ dyne/cm² and the melt flow rate (MFR) satisfy the relation:

$$FI > 100 \times MFR,$$

preferably $FI > 130 \times MFR$, more preferably $FI > 150 \times MFR$.

(vi) The temperature (Tm (°C)) at which the endothermic curve of the composition measured by a differential scanning calorimeter (DSC) shows the maximum peak and the density (d) satisfy the relation:

$$Tm < 400 \times d - 250,$$

preferably $Tm < 450 \times d - 297$, more preferably $Tm < 500 \times d - 344$, particularly preferably $Tm < 550 \times d - 391$.

(vii) The quantity fraction (W (% by weight)) of a n-decane-soluble component at room temperature (23° C.) and the density (d) satisfy the relation:

in the case of MFR<10 g/10 min:

$$W < 80 \times exp(-100(d-0.88)) + 0.1,$$

preferably $W < 60 \times exp(-100(d-0.88)) + 0.1$, more preferably $W < 40 \times exp(-100(d-0.88)) + 0.1$, and in the case of MFR>10 g/10 min:

$$W < 80 \times (MFR-9)^{0.26} \times exp(-100(d-0.88)) + 0.1.$$

The ethylene/α-olefin copolymer composition according to the invention may contain various additives if desired, for example, weathering stabilizer, heat stabilizer, antistatic agent, anti-slip agent, anti-blocking agent, anti-fogging agent, lubricant, pigment, dye, nucleating agent, plasticizer, anti-aging agent, hydrochloric acid absorbent and antioxidant, provided that the object of the invention is not marred.

The ethylene copolymer composition according to the present invention can be prepared by known processes, for example, processes described below.

(1) A process of mechanically blending the ethylene/α-olefin copolymer [A1] (or [A2]), the ethylene/α-olefin copolymer [B1], and if necessary, other optional components using an extruder, a kneader or the like.

(2) A process comprising dissolving the ethylene/α-olefin copolymer [A1] (or [A2]), the ethylene/α-olefin copolymer [B1], and if necessary, other optional components in an appropriate good solvent (e.g., hydrocarbon solvent such as hexane, heptane, decane, cyclohexane, benzene, toluene and xylene) and, then removing the solvent from the resulting solution.

(3) A process comprising independently dissolving the ethylene/α-olefin copolymer [A1] (or [A2]), the ethylene/α-olefin copolymer [B1], and if necessary, other optional components in an appropriate good solvent to prepare solutions, then mixing the solutions, and removing the solvent from the resulting mixture.

(4) A process in any combination of the above processes (1) to (3).

Further, the ethylene/α-olefin copolymer composition according to the present invention may be prepared by forming the ethylene/α-olefin copolymer [A1] (or [A2]) and tile ethylene/α-olefin copolymer [B1] in two or more copolymerization stages having reaction conditions different from each other, or may be prepared by separately froming the ethylene/α-olefin copolymer [A1] (or [A2]) and the ethylene/α-olefin copolymer [B1] by the use of plural polymerizers.

The ethylene/α-olefin copolymer composition according to the invention may be processed by a conventional molding method, for example, air-cooling inflation molding, two-stage air-cooling inflation molding, high-speed inflation molding, T-die film molding or water-cooling inflation molding, to obtain films. The films thus obtained are excellent in transparency and mechanical strength, and retain properties inherent in general LLDPE, such as heat-sealing properties, hot-tack properties and heat resistance. Further, the films are free from surface stickiness because the ethylene/α-olefin copolymers [A1], [A2] and [B1] have a prominently narrow composition distribution. Moreover, because of the high melt tension, the composition is excellent in bubble stability during the inflation molding.

The films obtained from the ethylene/α-olefin copolymer composition according to the invention are suitable for various packaging bags such as standard bags, sugar bags, packaging bags for oily goods and packaging bags for moist goods, and agricultural materials. Further, because of their high adhesion strength to nylon, polyester, etc., the films may be used as multi-layer films by laminating them on these substrates.

Next, the graft modified ethylene/α-olefin copolymer composition will be described below in detail.

The graft modified ethylene/α-olefin copolymer composition of the invention is a composition obtained by graft copolymerizing an ethylene/α-olefin copolymer composition [C] with a polar monomer. The ethylene/α-olefin copolymer composition [C] comprises an ethylene/α-olefin copolymer [A3] described later and the aforesaid ethylene/α-olefin copolymer [B1].

[Ethylene/α-olefin copolymer [A3]]

The ethylene/α-olefin copolymer [A3] for forming the ethylene/α-olefin copolymer composition [C] is a random copolymer of ethylene with an α-olefin of 3 to 20 carbon atoms which is similar to those described before.

In the ethylene/α-olefin copolymer [A3], it is desired that constituent units derived from ethylene are present in an amount of 50 to 100% by weight, preferably 55 to 99% by weight, more preferably 65 to 98% by weight, particularly preferably 70 to 96% by weight; and constituent units derived from an α-olefin of 3 to 20 carbon atoms are present in an amount of 0 to 50% by weight, preferably 1 to 45% by weight, more preferably 2 to 35% by weight, particularly preferably 4 to 30% by weight.

The ethylene/α-olefin copolymer [A3] preferably has the aforementioned properties (A-i) and (A-ii), more preferably has the properties (A-i) to (A-vi), and particularly preferably has the properties (A-i) to (A-viii).

The ethylene/α-olefin copolymer [A3] can be prepared by copolymerizing ethylene with an α-olefin of 3 to 20 carbon atoms in the presence of a catalyst for olefin polymerization prepared by contacting the organoaluminum oxy-compound (a), the transition metal compound (b'), the carrier and if necessary the organoaluminum compound (c), preferably in the presence of a catalyst for olefin polymerization prepared by contacting the component (a), at least two kinds of the transition metal compounds (b), the carrier and if necessary the organoaluminum compound (c), in such a manner that the resultant copolymer has a density of 0.850 to 0.980 g/cm$^3$.

In the preparation of the ethylene/α-olefin copolymer [A3], it is desired to use a combination of at least one kind of a transition metal compound represented by the above formula [b-I] and at least one kind of a transition metal compound represented by the above formula [b-II] as the transition metal compound (b). In concrete, preferably used are a combination of bis(1,3-n-butylmethylcyclopentadienyl)zirconium dichloride and bis(1,3-dimethylcyclopentadienyl)zirconium dichloride, a combination of bis(1,3-n-propylmethylcyclopentadienyl)zirconium dichloride and bis(1,3-dimethylcyclopentadienyl)zirconium dichloride, and a combination of bis(n-butylcyclopentadienyl)zirconium dichloride and bis(1,3-dimethylcyclopentadienyl)zirconium dichloride.

A molar ratio [(b-I)/(b-II)] of at least one kind of the transition metal compound (b-I) represented by the formula [b-I] to at least one kind of the transition metal compound (b-II) represented by the formula [b-II] is in the range of 99/1 to 50/50, preferably 97/3 to 70/30, more preferably 95/5 to 75/25, most preferably 90/10 to 80/20.

The catalyst used for preparing the ethylene/α-olefin copolymer [A3] can be obtained in a manner similar to that for the catalyst used for preparing the ethylene/α-olefin copolymers [A1] and [A2].

In the catalyst for olefin polymerization used for preparing the ethylene/α-olefin copolymer [A3], the transition metal atom derived from the component (b') (or the component (b)) is desirably supported in an amount of $5 \times 10^{-6}$ to $5 \times 10^{-4}$ g·atom, preferably $10^{-5}$ to $2 \times 10^{-4}$ g·atom, per 1 g of the carrier; and the aluminum atom derived from the component (a) and the component (c) is desirably supported in an amount of $10^{-3}$ to $5 \times 10^{-2}$ g·atom, preferably $2 \times 10^{-3}$ to $2 \times 10^{-2}$ g·atom, per 1 g of the carrier.

The catalyst used for preparing the ethylene/α-olefin copolymer [A3] may be a prepolymerized catalyst obtained by prepolymerizing an olefin in the presence of the component (a), the component (b') (or the component (b)), the carrier, and if necessary the component (c). This prepolymerized catalyst can be obtained in a manner similar to that for the prepolymerized catalyst used for preparing the ethylene/α-olefin copolymers [A1] and [A2].

In the prepolymerized catalyst, the component (b') (or the component (b)) is desirably supported in an amount of about $5 \times 10^{-6}$ to $5 \times 10^{-4}$ g·atom, preferably $10^{-5}$ to $2 \times 10^{-4}$ g·atom, in terms of the transition metal atom, per 1 g of the carrier; and the aluminum atom (Al derived from the component (a) and the component (c) is desirably supported in such an amount that the molar ratio (Al/M) of the aluminum atom (Al) derived from the component (a) and the component (c) to the transition metal atom (M) derived from the component (b) is in the range of 5 to 200, preferably 10 to 150.

The ethylene/α-olefin copolymer [A3] can be obtained by copolymerizing ethylene with the α-olefin of 3 to 20 carbon atoms described before under the same conditions as described before in the presence of, for example, a catalyst for olefin polymerization comprising the component (a), the component (b') (or the component (b)) and the carrier.

[Ethylene/α-olefin copolymer composition]

The ethylene/α-olefin copolymer composition [C] comprises the ethylene/α-olefin copolymer [A3] and the ethylene/α-olefin copolymer [B1] which is different from the ethylene/α-olefin copolymer [A3]. In this composition, it is desired that the ethylene/α-olefin copolymer [A3] is contained in an amount of 20 to 90% by weight, preferably 40 to 75% by weight, and the ethylene/α-olefin copolymer [B1] is contained in an amount of 10 to 80% by weight, preferably 25 to 60% by weight.

The ethylene/α-olefin copolymers [A3] and [B1] are used in an appropriate combination so that the ratio ([A3]/[B1]) in the density of the ethylene/α-olefin copolymer [A3] to the ethylene/α-olefin copolymer [B1] is preferably less than 1, more preferably in the range of 0.930 to 0.999.

The ethylene/α-olefin copolymer composition [C] preferably has the following properties (ii) to (vii).

(ii) The density (d) is in the range of usually 0.850 to 0.980 g/cm³, preferably 0.890 to 0.955 g/cm³, more preferably 0.900 to 0.950 g/cm³.

(iii) The melt flow rate (MFR) under the conditions of a temperature of 190° C. and a load of 2.16 kg is in the range of usually 0.1 to 100 g/10 min, preferably 0.2 to 50 g/10 min.

(iv) The melt tension (MT (g)) at 190° C. and the melt flow rate (MFP) satisfy the relation:

$$MT \geq 2.2 \times MFR^{-0.84}.$$

(v) The flow index (FI (1/sec)) defined by a shear rate which is given when a shear stress at 190° C. reaches $2.4 \times 10^6$ dyne/cm² and the melt flow rate (MFR) satisfy the relation:

$$FI > 100 \times MFR,$$

preferably $FI > 130 \times MFR$, more preferably $FI > 150 \times MFR$.

(vi) The temperature (Tm (°C)) at which the endothermic curve of the composition measured by a differential scanning calorimeter (DSC) shows the maximum peak and the density (d) satisfy the relation:

$$Tm < 400 \times d - 250,$$

preferably $Tm < 450 \times d - 297$, more preferably $Tm < 500 \times d - 344$, particularly preferably $Tm < 550 \times d - 391$.

(vii) The quantity fraction (W (% by weight)) of a n-decane-soluble component at room temperature (23° C.) and the density (d) satisfy the relation:

in the case of MFR ≤ 10 g/10 min:

$$W < 80 \times exp(-100(d-0.88)) + 0.1,$$

preferably $W < 60 \times exp(-100(d-0.88)) + 0.1$, more preferably $W < 40 \times exp(-100(d-0.88)) + 0.1$, and in the case of MFR > 10 g/10 min:

$$W < 80 \times (MFR-9)^{0.26} \times exp(-100(d-0.88)) + 0.1.$$

The ethylene/α-olefin copolymer composition [C] can be prepared by known processes, for example, processes similar to those described in the above mentioned ethylene/α-olefin copolymer composition.

[The graft modified ethylene/α-olefin copolymer composition [I]]

The graft modified ethylene/α-olefin copolymer composition [I] of the invention can be obtained by causing such an ethylene/α-olefin copolymer composition [C] as mentioned above to react with a polar monomer described below in the presence of a radical initiator.

Examples of the polar monomer include hydroxyl group-containing ethylenic unsaturated compounds, amino group-containing ethylenic unsaturated compounds, epoxy group-containing ethylenic unsaturated compounds, aromatic vinyl compounds, unsaturated carboxylic acids, derivatives of these acids, vinyl ester compounds and vinyl chloride.

Concrete examples of the hydroxyl group-containing ethylenic unsaturated compounds include (meth)acrylates, such as hydroxyethyl (meth)acrylate, 2-hydroxypropyl (meth)acrylate, 3-hydroxypropyl (meth)acrylate, 2-hydroxy-3-phenoxypropyl (meth)acrylate, 3-chloro-2-hydroxypropyl (meth)acrylate, glycerol mono(meth)acrylate, pentaerythritol mono(meth)acrylate, trimethylolpropane mono(meth)acrylate, tetramethylolethane mono(meth)acrylate, butanediol mono(meth)acrylate, polyethylene glycol mono(meth)acrylate and 2-(6-hydroxyhexanoyloxy)ethyl acrylate; and other compounds, such as 10-undecene-1-ol, 1-octene-3-ol, 2-methanol norbornene, hydroxystyrene, hydroxethyl vinyl ether, hydroxybutyl vinyl ether, N-methylolacrylamide, 2-n (meth)acryloyloxyethyl acid phosphate, glycerol monoallyl ether, allyl alcohol, allyloxyethanol, 2-butene-1,4-diol and glycerol monoalcohol.

The amino group-containing ethylenic unsaturated compound is a compound having an ethylenic double bond and an amino group. An example of such compound is a vinyl monomer having at least one substituted or unsubstituted amino group represented by the following formula:

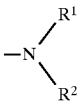

wherein $R^1$ is hydrogen, a methyl group or an ethyl group; and $R^2$ is hydrogen, an alkyl group having 1 to 12 carbon atoms, preferably 1 to 8 carbon atoms, or a cycloalkyl group having 6 to 12 carbon atoms, preferably 6 to 8 carbon atoms. These alkyl and cycloalkyl groups may further have a substituent group.

Concrete examples of such amino group-containing ethylenic unsaturated compound include alkyl acrylate type and alkyl methacrylate type derivatives, such as aminoethyl (meth) acrylate, propylaminoethyl (meth)acrylate, dimethylaminoethyl methacrylate, aminopropyl (meth)acrylate, phenylaminoethyl methacrylate and cyclohexylaminoethyl methacrylate; vinyl amine type derivatives, such as N-vinyldiethylamine and N-acetylvinylamine; allylamine type derivatives, such as allylamine, methacrylamine, N-methylacrylamine, N,N-dimethylacrylamide and N,N-dimethylaminopropylacrylamide; acrylamide type derivatives, such as acrylamide and N-methylacrylamide; aminostyrenes, such as p-aminostyrene; and other compounds, such as 6-aminohexyl succinimide and 2-aminoethyl succinimide.

The epoxy group-containing ethylenic unsaturated compound is a monomer having a polymerizable unsaturated bond and at least one epoxy group in one molecule.

Concrete examples of such epoxy group-containing ethylenic unsaturated compound include:

glycidyl acrylate and glycidyl methacrylate;

mono and alkylglycidyl esters of dicarboxylic acids (number of carbon atoms of the alkyl group in the case of monoglycidyl ester: 1–12), such as monoglycidyl maleate, diglycidyl maleate, monoglycidyl fumarate, diglycidyl fumarate, monoglycidyl crotonate, diglycidyl crotonate, monoglycidyl tetrahydrophthalate, diglycidyl tetrahydrophthalate, monoglycidyl itaconate, diglycidyl itaconate, monoglycidyl butenetricarboxylate, diglycidyl butenetricarboxylate, monoglycidyl citraconate, diglycidyl citraconate, monoglycidyl ester of endo-cis-bicyclo[2.2.1]hept-5-ene-2,3-dicarboxylic acid (nadic acid™), diglycidyl ester thereof, monoglycidyl ester of endo-cis-bicyclo[2.2.1]hept-5-ene-2-methyl-2,3-dicarboxylic acid (methylnadic acid™), diglycidyl ester thereof, monoglycidyl allylsuccinate and diglycidyl allylsuccinate; and other compounds, such as alkylglycidyl p-styrenecarboxylate, allyl glycidyl ether, 2-methylallyl glycidyl ether, styrene-p-glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene and vinylcyclohexene monoxide.

The aromatic vinyl compound is, for example, a compound represented by the following formula:

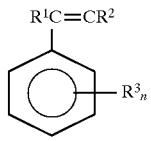

wherein $R^1$ and $R^2$ are each independently hydrogen or an alkyl group of 1 to 3 carbon atoms (concretely, methyl, ethyl, propyl or isopropyl), $R^3$ is a hydrocarbon group of 1 to 3 carbon atoms (concretely, methyl, ethyl, propyl or isopropyl) or a halogen atom (concretely, chlorine, bromine or iodine), and n is an integer of 0 to 5, preferably an integer of 1 to 5.

Concrete examples of such aromatic vinyl compound include styrene, (α-methylstyrene, α-methylstyrene, p-methylstyrene, m-methylstyrene, p-chlorostyrene, m-chlorostyrene, p-chloromethylstyrene, 4-vinylpyridine, 2-vinylpyridine, 5-ethyl-2-vinylpyridine, 2-methyl-5-vinylpyridine, 2-isopropenylpyridine, 2-vinylquinoline, 3-vinylisoquinoline, N-vinylcarbazole and N-vinylpyrrolidone.

Examples of the unsaturated carboxylic acids include unsaturated carboxylic acids, such as acrylic acid, methacrylic acid, maleic acid, fumaric acid, tetrahydrophthalic acid, itaconic acid, citraconic acid, crotonic acid, isocrotonic acid, norbornenedicarboxylic acid and bicyclo[2,2,1]hept-2-ene-5,6-dicarboxylic acid; anhydrides of these acids; and derivatives of these acids (e.g., acid halides, amides, imides and esters). Concrete examples of such compounds include malenyl chloride, malenyl imide, maleic anhydride, itaconic anhydride, citraconic anhydride, tetrahydrophthalic anhydride, bicyclo[2,2,1]hept-2-ene-5,6-dicarboxylic anhydride, dimethyl maleate, monomethyl maleate, diethyl maleate, diethyl fumarate, dimethyl itaconate, diethyl citraconate, dimethyl tetrahydrophthalate, dimethyl bicyclo[2,2,1]hept-2-ene-5,6-dicarboxylate, hydroxyethyl (meth)acrylate, hydroxypropyl (meth)acrylate, glycidyl (meth)acrylate, aminoethyl methacrylate and aminopropyl methacrylate.

Of these, preferred are (meth)acrylic acid, maleic anhydride, hydroxyethyl (meth)acrylate, glycidyl methacrylate and aminopropyul methacrylate.

Examples of the vinyl ester compounds include vinyl acetate, vinyl propionate, vinyl n-butyrate, vinyl isobutyrate, vinyl pivalate, vinyl caproate, vinyl versatate, vinyl laurate, vinyl stearate, vinyl benzoate, vinyl p-t-butyl benzoate, vinyl salicylate and vinyl cyclohexanecarboxylate.

The polar monomer is used in an amount of usually 1 to 100 parts by weight, preferably 5 to 80 parts by weight, per 100 parts by weight of the ethylene/α-olefin copolymer composition [C].

As the radical initiator, organic peroxides and azo compounds can be employed.

Examples of the organic peroxides include dicumyl peroxide, di-t-butyl peroxide, 2,5-dimethyl-2,5-bis(t-butylperoxy)hexane, 2,5-dimethyl-2,5-bis(t-butylperoxy)hexyne-3, 1,3-bis(t-butylperoxyisopropyl)benzene, 1,1-bis(t-butylperoxy)valerate, benzoyl peroxide, t-butyl peroxybenzoate, acetyl peroxide, isobutyryl peroxide, octanoyl peroxide, decanoyl peroxide, lauroyl peroxide, 3,5,5-trimethylhexanoyl peroxide, 2,4-dichlorobenzoyl peroxide and m-toluyl peroxide. Examples of the azo compounds include azoisobutyronitrile and dimethylazoisobutyronitrile.

The radical initiator is desirably used in an amount of 0.001 to 10 parts by weight per 100 parts by weight of the ethylene/α-olefin copolymer composition [C].

The radical initiator may be used by mixing it per se with the ethylene/α-olefin copolymer composition [C] and the polar monomer, or may be used in the form of a solution containing it in a small amount of an organic solvent. There is no specific limitation on the organic solvent used herein, and any organic solvents may be used as far as they can dissolve the radical initiator. Examples of such organic solvents include aromatic hydrocarbon type solvents, such as benzene, toluene and xylene; aliphatic hydrocarbon type solvents, such as pentane, hexane, heptane, octane, nonane and decane; alicyclic hydrocarbon type solvents, such as cyclohexane, methylcyclohexane and decahydronaphthalene; chlorinated hydrocarbon type solvents, such as chlorobenzene, dichlorobenzene, trichlorobenzene, methylene chloride, chloroform, carbon tetrachloride and tetrachloroethylene; alcohol type solvents, such as methanol, ethanol, n-propanol, iso-propanol, n-butanol, sec-butanol and tert-butanol; ketone type solvents, such as acetone, methyl ethyl ketone and methyl isobutyl ketone; ester type solvents, such as ethyl acetate and dimethyl phthalate; and ether type solvents, such as dimethyl ether, diethyl ether, di-n-amyl ether, tetrahydrofuran and dioxyanisole.

In the graft modification of the ethylene/α-olefin copolymer composition [C], a reducing material may be employed. The reducing material serves to increase the graft amount in tee resultant graft modified ethylene/α-olefin copolymer composition.

Examples of the reducing material include iron(II) ion, chromium ion, cobalt ion, nickel ion, palladium ion, sulfite, hydroxylamine, hydrazine and a compound containing —SH, $SO_3H$, —$NHNH_2$ or —COCH (OH)—.

Concrete examples of such reducing material include ferrous chloride, potassium bichromate, cobalt chloride, cobalt naphthenate, palladium chloride, ethanolamine, diethanolamine, N,N-dimethylaniline, hydrazine, ethylmercaptan, benzenesulfonic acid and p-toluenesulfonic acid.

The reducing material is used in an amount of usually 0.001 to 5 parts by weight, preferably 0.1 to 3 parts by weight, per 100 parts by weight of the ethylene/α-olefin copolymer composition. [C].

The graft modification of the ethylene/α-olefin copolymer composition [C] can be carried out by a conventionally known process. For example, the ethylene/α-olefin copolymer composition [C] is dissolved in an organic solvent, and to the resultant solution are added the polar monomer, the radical initiator, etc. to perform reaction at a temperature of 70 to 200° C., preferably 80 to 190° C., for a period of 0.5 to 15 hours, preferably 1 to 10 hours.

As the organic solvent used in the graft modification of the ethylene/α-olefin copolymer composition [C], any organic solvents may be used without any specific limitation as far as they can dissolve the ethylene/α-olefin copolymer composition [C].

Concrete examples of such organic solvents include aromatic hydrocarbon type solvents, such as benzene, toluene and xylene; and aliphatic hydrocarbon type solvents, such as pentane, hexane and heptane.

In the graft modified ethylene/α-olefin copolymer composition prepared above, the graft amount of the graft group derived from the polar group is usually in the range of 0.1 to 50% by weight, preferably 0.2 to 30% by weight.

The graft modified ethylene/α-olefin copolymer composition may also be prepared by causing the ethylene/α-olefin copolymer composition to react with the polar monomer in an extruder or the like without using any solvent. In this case, the reaction temperature is generally not lower than the melting point of the ethylene/α-olefin copolymer, concretely, in the range of 120 to 250° C., and the reaction time is generally in the range of 0.5 to 10 minutes.

The ethylene copolymer composition according to the present invention is formed from the above-mentioned graft modified ethylene/α-olefin copolymer composition [I] and polyolefin [II].

[Polyolefin [II]]

The polyolefin [II] used for forming the ethylene copolymer composition of the invention is a homopolymer of ethylene or an α-olefin of 3 to 20 carbon atoms, or a copolymer of at least two kinds of monomers selected from ethylene and α-olefins of 3 to 20 carbon atoms.

Examples of the α-olefins of 3 to 20 carbon atoms include propylene, 1-butene, 1-pentene, 2-methyl-1-butene, 3-methyl-1-butene, 1-hexene, 3-methyl-1-pentene, 4-methyl-1-pentene, 3,3-dimethyl-1-butene, 1-heptene, methyl-1-hexene, dimethyl-1-pentene, trimethyl-1-butene, ethyl-1-pentene, 1-octene, methyl-1-pentene, dimethyl-1-hexene, trimethyl-1-pentene, ethyl-1-hexene, methylethyl-1-pentene, diethyl-1-butene, propyl-1-pentene, 1-decene, methyl-1-nonene, dimethyloctene, trimethyl-1-heptene, ethyl-1-octene, methylethyl-1-heptene, diethyl-1-hexene, 1-dodecene and hexadodecene.

The polyolefin [II] is preferably a homopolymer of ethylene or an α-olefin of 3 to 8 carbon atoms, or a copolymer of at least two kinds of monomers selected from ethylene and α-olefins of 3 to 8 carbon atoms.

The polyolefin [II] used for forming the ethylene copolymer composition of the invention contains repeating units derived from ethylene or an α-olefin of 3 to 20 carbon atoms in an amount of usually not less than 50% by mol, preferably not less than 80% by mol, more preferably 100% by mol.

The polyolefin [II] may further contain repeating units derived from other compounds polymerizable with the α-olefin in addition to the repeating units derived from ethylene or the α-olefin of 3 to 20 carbon atoms.

Examples of the other compounds include chain polyene compounds, cyclic polyene compounds and cyclic monoene compounds.

These polyene compounds are those having at least two conjugated or non-conjugated olefinic double bonds.

Examples of the chain polyene compounds include 1,4-hexadiene, 1,5-hexadiene, 1,7-octadiene, 1,9-decadiene, 2,4,6-octatriene, 1,3,7-octatriene, 1,5,9-decatriene and divinylbenzene.

Examples of the cyclic polyene compounds include 1,3-cyclopentadiene, 1,3-cyclohexadiene, 5-ethyl-1,3-cyclohexadiene, 1,3-cycloheptadiene, dicyclopentadiene, dicyclohexadiene, 5-ethylidene-2-norbornene, 5-vinyl-2-norbornene, 5-isopropylidene-2-norbornene, methylhydroindene, 2,3-diisopropylidene-5-norbornene, 2-ethylidene-3-isopropylidene-5-norbornene, 2-ethylidene-3-isopropylidene-5-norbornene and 2-propenyl-2,5-norbornadiene.

Examples of the cyclic monoene compounds include:

monocycloalkenes, such as cyclopropene, cyclobutene, cyclopentene, cyclohexene, 3-methylcyclohexene, cycloheptene, cyclooctene, cyclodecene, cyclododecene, tetracyclodecene, octacyclodecene and cycloeicosene;

bicycloalkenes, such as norbornene, 5-methyl-2-norbornene, 5-ethyl-2-norbornene, 5-isobutyl-2-norbornene, 5,6-dimethyl-2-norbornene, 5,5,6-trimethyl-2-norbornene and 2-bornene;

tricycloalkenes, such as 2,3,3a,7a-tetrahydro-4,7-methano-1H-indene and 3a,5,6,7a-tetrahydro-4,7-methano-1H-indene;

tetracycloalkenes, such as 1,4,5,8-dimethano-1,2,3,4,4a,5,8,8a-octahydronaphthalene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2-propyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-stearyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-methyl-3-ethyl-1,4,5,8-dimethano-1,2,3,4,4a,5,8,8a-octahydronaphthalene, 2-chloro-1,4,5,8-dimethano-1,2,3,4,4a,5,8,8a-octahydronaphthalene, 2-bromo-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene and 2,3-dichloro-1,4,5,8-dimethano-1,2,3,4,4a,5,8,8a-octahydronaphthalene; and polycycloalkenes, such as hexacyclo[6,6,1,1$^{3.6}$,1$^{10.13}$,0$^{2.7}$,0$^{9.14}$] heptadecene-4, pentacyclo[8,8,1$^{2.9}$,1$^{4.7}$,1$^{11.18}$,0,0$^{3.8}$,0$^{12.17}$]heneicosene-5 and octacyclo[8,8,1$^{2.9}$,1$^{4.7}$,1$^{11.18}$,0,0$^{3.8}$,0$^{12.17}$] docosene-5.

The polyolefin [II] may further contain constituent units derived from styrene or substituted styrene.

It is desired that the polyolefin [II] has an intrinsic viscosity [η], as measured in decalin at 135° C., of usually 0.4 to 7 dl/g, preferably 0.5 to 5 dl/g.

The polyolefin [II] for forming the ethylene copolymer composition of the invention can be prepared by polymerizing or copolymerizing the above-mentioned α-olefin by a conventionally known process. The (co)polymerization reaction may be carried out either in a gas phase (gas phase process) or in a liquid phase (liquid phase process).

[Ethylene copolymer composition]

The ethylene copolymer composition according to the invention comprises the above-mentioned graft modified ethylene/α-olefin copolymer composition [I] and polyolefin [II]. A weight ratio ([I]:[II]) between the graft modified ethylene/α-olefin copolymer composition [I] and the polyolefin [II] is in the range of 1:99 to 99:1, preferably 2:98 to 98:2.

The ethylene copolymer composition of the invention may contain various additives if desired, for example, weathering stabilizer, heat stabilizer, antistatic agent, anti-slip agent, anti-blocking agent, anti-fogging agent, lubricant, pigment, dye, nucleating agent, plasticizer, anti-aging agent, hydrochloric acid absorbent and antioxidant, provided that the object of the invention is not marred.

The ethylene copolymer composition according to the present invention can be prepared by known processes, for example, processes described below.

(1) A process of mechanically blending the graft modified ethylene/α-olefin copolymer composition [I], the polyolefin [II], and if necessary, other optional components using an extruder, a kneader or the like.

(2) A process comprising dissolving the graft modified ethylene/α-olefin copolymer composition [I], the polyolefin [II], arid if necessary, other optional components in an appropriate good solvent (e.g., hydrocarbon solvent such as hexane, heptane, decane, cyclohexane, benzene, toluene and xylene) and, then removing the solvent from the resulting solution.

(3) A process comprising independently dissolving the graft modified ethylene/α-olefin copolymer composition [I], the polyolefin [II], and if necessary, other optional components in an appropriate good solvent to prepare solutions, then mixing the solutions, and removing the solvent from the resulting mixture.

(4) A process in any combination of the above processes (1) to (3).

The the ethylene copolymer composition according to the invention may be processed by a conventional molding method, for example, normal press molding, air-cooling inflation molding, two-stage air-cooling inflation molding, high-speed inflation molding, T-die film molding or water-cooling inflation molding, to obtain films. The films thus obtained are excellent in transparency and mechanical strength, and retain properties inherent in general LLDPE, such as heat-sealing properties, hot-tack properties and heat resistance. Further, the films are free from surface stickiness because the ethylene/α-olefin copolymer [A3] and the ethylene/α-olefin copolymer [B1] have a prominently narrow composition distribution. Moreover, because of low stress within the high-shear region, the ethylene copolymer composition can be extruded at high speed, and thus consumption of electric power is small, resulting in economical advantage.

The films obtained from the graft modified ethylene/α-olefin copolymer and the ethylene copolymer composition according to the invention are suitable for various packaging bags such as standard bags, sugar bags, packaging bags for oily goods and packaging bags for moist goods, and agricultural materials. Further, because of their high adhesion strength to nylon, polyester, a metal foil, etc., the films may be used as multi-layer films by laminating them on these substrates.

Next, the multi-stage olefin polymerization process according to the present invention will be described below.

The multi-stage olefin polymerization process of the invention comprises:

a stage (1) of preparing an ethylene/α-olefin copolymer [A1] by copolymerizing ethylene with an α-olefin of 3 to 20 carbon atoms in the presence of a catalyst for olefin polymerization (C1) comprising:
(a) an organoaluminum oxy-compound,
(b-I) at least one kind of a transition metal compound represented by the above formula [b-I], and
(b-II) at least one kind of a transition metal compound represented by the above formula [b-II]; and a stage (2) of preparing an ethylene/α-olefin copolymer [B1] by copolymerizing ethylene with an α-olefin of 3 to 20 carbon atoms in a different polymerizer from that for the copolymerization reaction of the stage (1) in the presence of a catalyst for olefin polymerization (C2) comprising (a) an organoaluminum oxy-compound and (b') a compound of Group IV transition metal of the periodic table containing a ligand having a cyclopentadienyl skeleton.

The catalyst for olefin polymerization (C1) used for the invention is a catalyst (C1-i) comprising the component (a) and the component (b) (the component (b-I) and the component (b-II)); a solid catalyst (C1-ii) in which the component (a) and the component (b) are supported on the carrier; a prepolymerized catalyst (C1-iii) obtained by prepolymerizing an olefin on the solid catalyst (C1-ii) (solid catalyst component); a catalyst comprising the catalyst (C1-i) (catalyst component) and the component (c); a catalyst comprising the solid catalyst (C1-ii) (solid catalyst component) and the component (c); or a catalyst comprising the prepolymerized catalyst (C1-iii) (prepolymerized catalyst component) and the component (c).

The catalyst for olefin polymerization (C2) used for the invention is a catalyst (C2-i) comprising the component (a) and the component (b-III); a solid catalyst (C2-ii) in which the component (a) and the component (b-III) are supported on the carrier; a prepolymerized catalyst (C2-iii) obtained by prepolymerizing an olefin on the solid catalyst (C2-ii) (solid catalyst component); a catalyst comprising the catalyst (C2-i) and the component (c); a catalyst comprising the solid catalyst (C2-ii) (solid catalyst component) and the component (c); or a catalyst comprising the prepolymerized catalyst (C2-iii) (prepolymerized catalyst component) and the component (c).

The catalyst (C1-i) and the catalyst (C2-i) can be prepared by mixing and contacting each catalyst components in or outside a polymerizer. Further, they can be prepared by a process comprising making the component (a) solid component, contacting the resultant solid component with the component (b) (or the component (b-III)) to form a solid catalyst and adding the solid catalyst to the polymerization system, or by a process comprising initially contacting the component (a) with the component (b) (or the component (b-III)) to form a solid catalyst and adding the solid catalyst to the polymerization system.

The catalyst (C1-i) can be prepared by mixing and contacting the component (a) with the component (b) and if necessary the component (c) in an inert solvent. The contact between each components may be carried out in an arbitrarily selected order. In the case of the contact between the component (a) and the component (b), it is preferred to add the component (b) to a suspenstion of the component (a). Further, it is preferred that at least two kinds of the transition metal compounds are beforehand mixed to form the component (b) and then the component (b) is contacted with other components.

Examples of the inert hydrocarbon solvent used for preparing the catalyst (C1-i) include the same ones as used for preparing the aforementioned catalysts.

In the contact of the component (a) with the component (b) and if necessary the component (c), the concentration of aluminum in the component (a) is in the range of about 0.1 to 5 mol/l, preferably 0.3 to 3 mol/l. An atomic ratio (Al/transition metal) of the aluminum atom (Al) in the component (a) to the transition metal in the component (b) is in the range of usually 10 to 500, preferably 20 to 200. An atomic ratio (Al-c/Al-a) of the aluminum atom (Al-c) in the component (c) which is optionally used to the aluminum atom (Al-a) in the component (a) is in the range of usually 0.02 to 3, preferably 0.05 to 1.5. The temperature for contacting the component (a) with the component (b) and if necessary the component (c) is in the range of usually $-50°$ to 150° C., preferably $-20°$ to 120° C., and the period of time therefor is in the range of 1 minute to 50 hours, preferably 10 minutes to 25 hours.

The catalyst (C2-ii) used for the invention can be prepared using the component (a), the component (b-III) and if necessary the component (c) in a manner similar to that for the above catalyst (C1-i).

In the catalyst (C1-i) and the catalyst (C2-i) prepared above, the transition metal atom derived from the component (b) (or the component (b')) is desirably contained in an amount of $5 \times 10^{-6}$ to $5 \times 10^{-4}$ g·atom, preferably $10^{-5}$ to $2 \times 10^{-4}$ g·atom, per 1 g of the catalyst, and the aluminum atom derived from the component (a) and the component (c) is desirably contained in an amount of $10^{-2}$ to $2.5 \times 10^{-2}$ g·atom, preferably $1.5 \times 10^{-2}$ to $2 \times 10^{-2}$ g·atom, per 1 g of the catalyst.

The solid catalyst (C1-ii) used for the invention is the same catalyst for olefin polymerization as the aforementioned solid catalyst (1), and the solid catalyst (C2-ii) used for the invention is the same catalyst for olefin polymerization as the aforementioned solid catalyst (2).

The prepolymerized catalyst (C1-iii) used for the invention is the same catalyst for olefin polymerization as the aforementioned prepolymerized catalyst (1), and the prepolymerized catalyst (C2-iii) used for the invention is the same catalyst for olefin polymerization as the aforementioned prepolymerized catalyst (2).

The multi-stage olefin polymerization process according to the invention comprises a stage (1) of copolymerizing ethylene with an α-olefin of 3 to 20 carbon atoms in the presence of the above-mentioned catalyst for olefin polymerization (C1) to prepare the ethylene/α-olefin copolymer [A1] and a stage (2) of copolymerizing ethylene with an α-olefin of 3 to 20 carbon atoms in the presence of the above-mentioned catalyst for olefin polymerization (C2) to prepare the ethylene/α-olefin copolymer [B].

Examples of the α-olefin of 3 to 20 carbon atoms used herein include propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In the invention, copolymerization of ethylene with the α-olefin may be carried out either in a gas phase or in a liquid phase such as slurry. In the slurry polymerization, an inert hydrocarbon may be used as a solvent, or the olefin itself may be used as a solvent.

Examples of the inert hydrocarbon solvent used for the slurry polymerization include the same ones as described before. Of various inert hydrocarbon solvents, preferred are aliphatic hydrocarbons, alicyclic hydrocarbons and petroleum fractions.

In the slurry polymerization or the gas phase polymerization, the catalyst for olefin polymerization (C1) or (C2) is used in such an amount that the concentration of the transition metal atom in the polymerization reaction system is in the range of usually $10^{-8}$ to $10^{-3}$ g·atom/l, preferably $10^{-7}$ to $10^{-4}$ g·atom/l.

In the polymerization, an organoaluminum oxy-compound which is the same as the component (a) and/or the organoaluminum compound (c) may be added. In this case, the atomic ratio (Al/M) of the aluminum atom (Al) derived from the organoaluminum oxy-compound and the organoaluminum compound to the transition metal atom (M) derived from the component (b) (or the component (b')) is in the range of 5 to 300, preferably 10 to 200, more preferably 15 to 150.

In the invention, the temperature for the slurry polymerization is in the range of usually $-50°$ to 100° C., preferably 0° to 90° C., while the temperature for the gas phase polymerization is in the range of usually 0 to 120° C., preferably 20° to 100° C.

The polymerization pressure is in the range of usually atmospheric pressure to 100 kg/cm$^2$, preferably 2 to 50 kg/cm$^2$.

In the multi-stage olefin polymerization process of the invention, plural polymerizers combined with each other in series are used. First, the ethylene/α-olefin copolymer [A1] is prepared in the presence of the catalyst for olefin polymerization (C1) in a polymerizer, and then the ethylene/α-olefin copolymer [B1] is prepared in the presence of the catalyst for olefin polymerization (C2) in a polymerizer different from the polymerizer of the above copolymerization. Otherwise, the ethylene/α-olefin copolymer [B1] is first prepared in the presence of the catalyst for olefin polymerization (C2) in a polymerizer, and then the ethylene/α-olefin copolymer [A1] is prepared in the presence of the catalyst for olefin polymerization (C1) in a polymerizer different from the polymerizer of above copolymerization. In the invention, plural polymerizers combined with each other in parallel may be used. In this case, it is possible to prepare the ethylene/α-olefin copolymer [A1] and the ethylene/α-olefin copolymer [B1] in different polymerizers, followed by blending the ethylene/α-olefin copolymer [A1] with the ethylene/α-olefin copolymer [B1].

In the multi-stage olefin polymerization process of the invention, when the ethylene/α-olefin copolymer [A1] is prepared by a slurry polymerization, the polymerization temperature is in the range of usually $-50°$ to 90° C., preferably 0° to 85° C., but when the copolymer [A1] is prepared by a gas phase polymerization, the polymerization temperature is in the range of usually 0° to 100° C., preferably 20 to 90° C. When the ethylene/α-olefin copolymer [B1] is prepared by a slurry polymerization, the polymerization temperature is in the range of usually $-30°$ to 100° C., preferably 20° to 90° C., but when the copolymer [B1] is prepared by a gas phase polymerization, the polymerization temperature is in the range of usually 20° to 120° C., preferably 30° to 100° C.

The ethylene/α-olefin copolymer composition prepared by the multi-stage olefin polymerization process of the invention comprises the ethylene/α-olefin copolymer [A1] and the ethylene/α-olefin copolymer [B1]. In this composition, it is desired that the ethylene/α-olefin copolymer [A1] is contained in an amount of 20 to 90% by weight, preferably 40 to 75% by weight, and the ethylene/α-olefin copolymer [B1] is contained in an amount of 10 to 80% by weight, preferably 25 to 60% by weight.

The ethylene/α-olefin copolymer composition is prepared in such a manner that the ratio ([A1]/[B1]) in the density of the ethylene/α-olefin copolymer [A1] to the ethylene/α-olefin copolymer [B1] is less than 1, preferably in the range of 0.930 to 0.999.

The ethylene/α-olefin copolymer composition preferably has the same properties as the aforesaid first ethylene/α-olefin copolymer composition has.

The ethylene copolymer composition prepared by the multi-stage olefin polymerization process of the invention may contain various additives if desired, for example, weathering stabilizer, heat stabilizer, antistatic agent, anti-slip agent, anti-blocking agent, anti-fogging agent, lubricant, pigment, dye, nucleating agent, plasticizer, anti-aging agent, hydrochloric acid absorbent and antioxidant.

The ethylene/α-olefin copolymer composition prepared by the multi-stage olefin polymerization process of the invention may be processed by a conventional molding method, for example, air-cooling inflation molding, two-stage air-cooling inflation molding, high-speed inflation molding, T-die film molding or water-cooling inflation molding, to obtain a film. The film thus obtained is excellent in transparency, mechanical strength and blocking resistance, and retains properties inherent in general LLDPE, such as heat-sealing properties, hot-tack properties and heat resistance. Further, the film is free from surface stickiness because the ethylene/α-olefin copolymers [A1] and [B1] have a prominently narrow composition distribution. The ethylene/α-olefin copolymer composition is excellent in bubble stability in the inflation molding stage because it has high melt tension. Moreover, because of low stress within the high-shear region, the composition can be extruded at a high speed and the consumption of electric power is small, resulting in economical advantage.

The films obtained from the ethylene/α-olefin copolymer composition prepared by the multi-stage olefin polymerization process of the invention are suitable for various packaging bags such as standard bags, sugar bags, packaging bags for oily goods and packaging bags for moist goods, and agricultural materials. Further, they can be used as multi-layer films by laminating them on substrates such as a nylon substrate and a polyester substrate.

EFFECT OF THE INVENTION

The ethylene/α-olefin copolymer composition of the present invention is excellent in heat stability and moldability. From this ethylene/α-olefin copolymer composition, a film having high transparency, high mechanical strength and high blocking resistance can be produced.

The graft modified ethylene/α-olefin copolymer composition of the present invention is excellent in moldability because it has high melt tension and low stress within high-shear region. From this graft modified ethylene/α-olefin copolymer composition, a film having high transparency and good adhesion to highly polar materials can be produced.

The ethylene copolymer composition of the present invention is a blend of the graft modified ethylene/α-olefin copolymer composition [I] having low surface stickiness, high heat stability and good moldability, with the polyolefin [II]. Accordingly, this composition has high melt tension and low stress within high-shear region, and therefore, it is excellent in moldability. From this ethylene copolymer composition, a film having high transparency and good adhesion to highly polar materials can be produced.

By the multi-stage olefin polymerization process of the present invention, there can be prepared an ethylene/α-olefin copolymer composition which has high heat stability and good moldability and from which a film of high transparency, high mechanical strength and high blocking resistance can be produced.

[EXAMPLE]

The present invention is further described below with reference to examples, but it should be construed that the present invention is in no way limited to those examples.

In the invention, physical properties of films were evaluated in the following manner.
Haze
The haze was measured in accordance with ASTM-D-1003-61.

In the case of a graft modified ethylene/α-olefin copolymer composition, a pressed sheet having a thickness of 0.5 mm was prepared from the composition and the pressed sheet was measured on the haze in accordance with ASTM-D-1003-61. In order to avoid an influence of the sheet surface on the measured value, the haze, namely, internal haze, was measured in the state where the pressed sheet was immersed in an optical cell made of quartz filled with benzyl alcohol.
Gloss
The gloss was measured in accordance with JIS Z874i.
Film Impact
The film impact was measured by means of a pendulum type film impact tester produced by Toyo Seiki Seisakusho K.K.
Adhesion strength
A pressed sheet of a modified copolymer having a thickness of 100 μm was used as a sample. The sample was heat sealed with two kinds of adherends respectively and was measured on the peel strength to evaluate the adhesion strength. One adherend is an aluminum foil having a thickness of 0.5 mm, and the other adherend is a 6-nylon sheet having a thickness of 1.0 mm. The heat sealing between the pressed sheet and the adherend was conducted using a heat sealer under the conditions of a temperature of 200° C., a load of 1 kg/cm$^2$ and a period of 60 sec. After the heat sealing, the pressed sheet with the adherend was cut to give a specimen having a width of 25 mm and a length of 150 mm. The adhesion strength between the two layers (the modified polymer layer and the adherend layer) of the specimen was measured by peeling the adherend layer in the direction of 180° against the modified polymer layer at a peel rate of 200 mm/min.

Preparation Example 1
Preparation of an ethylene/α-olefin copolymer
[Preparation of a Catalyst Component]

5.0 kg of silica having been dried at 250° C. for 10 hours was suspended in 80 liters of toluene, and the 94 resultant suspension was cooled to 0° C. Thereafter, to the suspension was dropwise added 28.7 liters of a toluene solution of methylaluminoxane (Al: 1.33 mol/l) over a period of 1 hour. During the addition, the temperature of the system was kept at 0° C. The reaction was successively carried out at 0° C. for 30 minutes. Then, the temperature of the system was elevated to 95° C. over a period of 1.5 hours, and at the same temperature the reaction was conducted for 20 hours. After that, the temperature of the system was lowered to 60° C., and the supernatant liquid was removed by decantation.

The solid portion obtained above was washed twice with toluene and then again suspended in 80 liters of toluene. To the reaction system were dropwise added 6.6 liters of a toluene solution of bis(1,3-n-butylmethylcyclopentadienyl) zirconium dichloride (Zr: 34.0 mmol/l) and 2.0 liters of a toluene solution of bis(1,3-dimethylcyclopentadienyl) zirconium dichloride (Zr: 28.1 mmol/l) at 80° C. over a period of 30 minutes, and the reaction was further carried out at 80° C. for 2 hours. Then, the supernatant liquid was removed, and the residue was washed twice with hexane to obtain a solid catalyst containing zirconium in an amount of 3.6 mg per 1 g of the solid catalyst.

[Preparation of a Prepolymerized Catalyst]

To 85 liters of hexane containing 1.7 mol of triisobutylaluminum were added 0.85 kg of the solid catalyst obtained above and 255 g of 1-hexene. The resultant mixture was subjected to prepolymerization with ethylene at 35° C. for 12 hours to obtain a prepolymerized catalyst in which polyethylene was prepolymerized in an amount of 10 g per 1 g of the solid catalyst. This ethylene polymer had an intrinsic viscosity [η] of 1.74 di/g.

[Polymerization]

In a fluidized bed gas phase polymerizer of continuous type, ethylene was copolymerized with 1-hexene at the total pressure of 20 kg/cm$^2$-G and a polymerization temperature of 70° C. To the polymerizer were continuously fed the prepolymerized catalyst prepared above at a feed rate of 0.18 mmol/hr in terms of zirconium atom and triisobutylaluminum at a feed rate of 10 mmol/hr while continuously feeding ethylene, 1-hexene, hydrogen and nitrogen to maintain a constant gas composition (gas composition: 1-hexene/ethylene=0.032, hydrogen/ethylene=4.5×10$^{-4}$, ethylene concentration=25%) during the polymerization.

Thus, an ethylene/1-hexene copolymer was obtained in an amount of 6.3 kg/hr. The copolymer had MFR of 0.40 g/10 min, a density of 0.908 g/cm$^3$ and a decane-soluble portion quantity at room temperature of 0.54% by weight.

Physical properties of the ethylene/1-hexene copolymer are set forth in Table 1.

Example 1

[Preparation of a Composition]

The ethylene/1-hexene copolymer (A-1) (density: 0.908 g/cm$^3$, MRF: 0.40 g/10 min) prepared in Preparation Example 1 and an ethylene/1-hexene copolymer (B-1) prepared in the same manner as described in Preparation Example 1 except for adjusting the density and MFR of the copolymer to those set forth in Table 1 were dry blended in a mixing ratio of %[(A-1)/(B-1)]. To the resultant blend were added 0.05 % by weight of tri(2,4-di-t-butylphenyl) phosphate as a secondary antioxidant, 0.1% by weight of n-octadecyl-3-(4'-hydroxy-3',5'-di-t-butylphenyl)propionate as a heat stabilizer and 0.05% by weight of calcium stearate as a hydrochloric acid absorbent, per 100 parts by weight of the resin. Then, the resultant mixture was kneaded at a preset temperature of 180° C. by means of a conical tapered twin-screw extruder produced by Haake Buchler Instrument Inc., to prepare an ethylene/α-olefin copolymer composition.

The ethylene/α-olefin copolymer composition had a density of 0.922 g/cm$^3$ and MFR of 1.9 g/10 mmn.

[Preparation of Film]

The ethylene/α-olefin copolymer composition obtained above was subjected to inflation by the use of a single-screw extruder (20 mmφ·L/D=26) equipped with a die of 25 mmφ (lip width: 0.7 mm) and a single-slit air ring under the conditions of an air flow rate of 90 l/min, an extrusion rate of 9 g/min, a blow ratio of 1.8, a take-up rate of 2.1 m/min and a processing temperature of 200° C., to form a film having a thickness of 30 μm.

Melt properties of the ethylene/α-olefin copolymer composition and physical properties of the film formed from the composition are set forth in Table 2.

As is evident from Table 2, the ethylene/α-olefin copolymer composition was excellent in flowability and moldability, and an inflation film of high optical characteristics and high strength was obtained from this composition.

Reference Example 1

An ethylene/1-hexene copolymer (C-1)) having almost the same density and MFR as those of the composition obtained in Example 1 was prepared in the same manner as described in Preparation Example 1 except for varying the gas composition. This ethylene/1-hexene copolymer (C-1) was subjected to inflation in the same manner as described in Example 1, to form a film having a thickness of 30 μm.

Physical properties of the ethylene/1-hexene copolymer (C-1) are set forth in Table 1. Melt properties of the ethylene/1-hexene copolymer (C-1) and physical properties of the film formed from the copolymer are set forth in Table 2.

As is evident from comparison between Example 1 and Reference Example 1, toe film of Example 1 was excellent in the strength and the composition of Example 1 was excellent in the flow index (FI) within high-shear region.

Comparative Example 1

An ethylene/1-hexene copolymer (A-2) and an ethylene/1-hexene copolymer (B-2), both having been prepared in the same manner as described in Preparation Example 1 except for using bis(1,3-dimethylcyclopentadienyl)zirconium dichloride singly as the zirconium compound in the catalyst component, were melt kneaded in such a weight ratio as set forth in Table 2, to prepare an ethylene/α-olefin copolymer composition.

The ethylene/α-olefin copolymer composition had a density of 0.921 g/cm$^3$ and MFR of 2.0 g/10 min.

The ethylene/α-olefin copolymer composition was subjected to inflation in the same manner as described in Example 1 to form a film having a thickness of 30 μm.

Melt properties of the ethylene/α-olefin copolymer composition and physical properties of the film formed from the composition are set forth in Table 2.

Comparative Example 2

An ethylene/1-hexene copolymer (A-3) and an ethylene/1-hexene copolymer (B-3), both having been prepared in the same manner as described in Preparation Example 1 except for using bis(1,3-n-butylmethylcyclopentadienyl)zirconium dichloride singly as the zirconium compound in the catalyst component, were melt kneaded in such a weight ratio as set forth in Table 2, to prepare an ethylene/α-olefin copolymer composition.

The ethylene/α-olefin copolymer composition had a density of 0.922 g/cm$^3$ and MFR of 1.9 g/10 min.

Tile ethylene/α-olefin copolymer composition was subjected to inflation in the same manner as described in Example 1 to form a film having a thickness of 30 μm.

Melt properties of the ethylene/α-olefin copolymer composition and physical properties of the film formed from the composition are set forth in Table 2.

As is evident from Table 2, the film of Example 1 was superior in the optical properties to the films of Comparative examples 1 and 2, superior in the moldability (MT) and the film impact to the film of Comparative Example 1, and superior in the moldability (MT) and the flow index (FI) within high-shear region to the film of Comparative Example 2.

Example 2

The ethylene/1-hexene copolymer (A-1) prepared in Preparation Example 1 and the ethylene/1-hexene copolymer (B-3) were melt kneaded in such a weight ratio as set forth in Table 2, to prepare an ethylene/α-olefin copolymer composition.

The ethylene/α-olefin copolymer composition had a density of 0.917 g/cm³ and MFR of 1.2 g/10 min.

The ethylene/α-olefin copolymer composition was subjected to inflation in the same manner as described in Example 1 to form a film having a thickness of 30 μm.

Melt properties of the ethylene/α-olefin copolymer composition and physical properties of the film formed from the composition are set forth in Table 2.

As is evident from Table 2, the ethylene/α-olefin copolymer composition was excellent in flow index (FI) within high-shear region and moldability (MT), and an inflation film of high optical characteristics and high film impact was obtained from this composition.

TABLE 1

| Code No. | Comonomer Kind | Amount mol. % | Catalyst*¹ I/II by mol | Density g/cm³ | MFR g/10- min | [η] dl/g | Mw/Mn |
|---|---|---|---|---|---|---|---|
| A-1 | 1-hexene | — | 8/2 | 0.908 | 0.40 | 2.00 | 2.5 |
| A-2 | 1-kiexene | 4.8 | 0/10 | 0.907 | 0.35 | 1.88 | 3.5 |
| A-3 | 1-hexene | — | 10/0 | 0.909 | 0.46 | 2.30 | 3.1 |
| B-1 | 1-hexene | — | 8/2 | 0.943 | 180 | 0.68 | — |
| B-2 | 1-hexene | 1.0 | 0/10 | 0.943 | 165 | 0.70 | — |
| B-3 | 1-hexene | — | 10/0 | 0.943 | 170 | 0.68 | — |
| C-1 | 1-hexene | 2.9 | 8/2 | 0.923 | 2.1 | 1.64 | 2.6 |

| Code No. | Tm °C. | MT g | FI *² s⁻¹ | *³ | Decane Soluble Portion wt. % | MT / Mw/Mn | *⁴ |
|---|---|---|---|---|---|---|---|
| A-1 | 93.0 | 5.7 | 4.7 | 46 | 60 | 0.54 | 2.28 | 0.60 |
| A-2 | 92.8 | 5.9 | 5.3 | 92 | 53 | 0.55 | 1.69 | 4.89 |
| A-3 | 93.1 | 3.6 | 4.2 | 30 | 69 | 0.52 | 1.16 | 0 |
| B-1 | 118.6 | <0.1 | — | 13,000 | — | 0.69 | — | — |
| B-2 | 118.6 | <0.1 | — | 12,400 | — | 0.45 | — | — |
| B-3 | 118.5 | <0.1 | — | 13,500 | — | 0.44 | — | — |
| C-1 | 114.5 | 2.1 | 1.2 | 212 | 315 | — | 0.81 | 0.03 |

*¹Transition metal in the catalyst component
I: bis(1,3-n-butylmethylcyclopentadienyl)zirconium dichloride
II: bis(1,3-dimethylcyclopentadienyl)zirconium dichloride
*²: value of 2.2 × MFR⁻⁰·⁸⁴
*³: value of 150 × MFR
*⁴: value of 0.03 × FI/MFR − 3.0 (In the case of less than 0, the value is taken as 0.)

TABLE 2

| | Component A Code No. | Component B Code No. | Mixing Ratio A/B (by weight) | Density d g/cm³ |
|---|---|---|---|---|
| Ex. 1 | A-1 | B-1 | 60/40 | 0.922 |
| Ref. Ex. 1 | | C-1 | — | 0.923 |
| Comp. Ex. 1 | A-2 | B-2 | 60/40 | 0.921 |
| Comp. Ex. 2 | A-3 | B-3 | 60/40 | 0.922 |
| Ex. 2 | A-1 | B-3 | 70/30 | 0.917 |

TABLE 2-continued

| | Melt properties of Ethylene/α-olefin Copolymer Compogition | | |
|---|---|---|---|
| | MFR g/10 min | MT g | FI s⁻¹ |
| Ex. 1 | 1.9 | 2.2 | 410 |
| Ref. Ex. 1 | 2.1 | 2.1 | 212 |
| Comp. Ex. 1 | 2.0 | 1.9 | 520 |
| Comp. Ex. 2 | 1.9 | 0.9 | 260 |
| Ex. 2 | 1.2 | 3.8 | 230 |

| | Physical Properties of Film | | | |
|---|---|---|---|---|
| | Haze % | Gloss % | Film Impact kg · cm/cm | Moldability*² |
| Ex. 1 | 8.1 | 67 | 6,930 | BB |
| Ref. Ex. 1 | 5.6 | 88 | 2,270 | BB |
| Comp. Ex. 1 | 10.5 | 54 | 5f770 | CC |
| Comp. Ex. 2 | 25.1 | 18 | NB*¹ | CC |
| Ex. 2 | 7.6 | 70 | NB*¹ | AA |

*¹NB = not broken (film impact > 8,500 kg · cm/cm)
*²Moldability
AA: MT ≧ 3 g
BB: 2 g ≦ MT < 3 g
CC: MT < 2 g Example 3

825 g of the ethylene/α-olefin copolymer composition (ethylene/α-olefin copolymer composition obtained in Example 1, density: 0.922 g/cm³, MFR: 1.9 g/10 min) was dissolved at 160° C. in 5.7 liters of toluene as a reaction solvent.

Then, to the resultant solution were slowly added a toluene solution of maleic anhydride (4.13 g/250 ml) and a toluene solution of dicumyl peroxide (DCP) (0.33 g/50 ml) over a period of 4 hours through different conduits.

After the addition was completed, the reaction was further continued for 30 minutes at 160° C. Then, the temperature of the system was cooled to room temperature to precipitate a polymer. The precipitated polymer was filtered, then repeatedly washed with acetone and dried at 80° C. for one day and night under a reduced pressure, to obtain an aimed modified ethylene/α-olefin copolymer composition.

The modified ethylene/α-olefin copolymer composition was subjected to elemental analysis to determine the graft amount of the maleic anhydride. As a result, in the modified ethylene/α-olefin copolymer composition, maleic anhydride was graft polymerized in an amount of 0.2 g per 100 g of the modified ethylene/α-olefin copolymer composition. Further, the modified ethylene/α-olefin copolymer composition had a density of 0.922 g/cm³ and MFR of 1.0 g/10 min.

The modified ethylene/α-olefin copolymer composition was measured on the physical properties such as melt properties. The results are set forth in Table 3.

[Molding of a Pressed Sheet]

The modified ethylene/α-olefin copolymer composition was heated at 200° C. for 10 minutes by a press molding machine. Then, the composition was held under a pressure of 100 kg/cm² for 3 minutes and was further held under a pressure of 100 kg/cm² for 5 minutes using a cooled pressing machine of 20° C. to mold the composition into a pressed sleet.

The pressed sheet was measured on various properties such as transparency and adhesion strength to an aluminum foil or to a 6-nylon sheet. The results are set forth in Table 3.

As is evident from Table 3, the modified ethylene/α-olefin copolymer composition had high transparency and showed good moldability owing to high melt tension and high flow index. Further, the composition was excellent in the adhesion strength to highly polar materials such as aluminum and nylon.

TABLE 3

| | Modified Ethylene/α-olefin Copolymer Composition | | | | | Adhesion to Adherend | |
|---|---|---|---|---|---|---|---|
| | MFR g/10 min | Density g/cm$^3$ | MT g | FI s$^{-1}$ | Haze % | to Aluminum kg/25 mm | to 6-Nylon kg/26 mm |
| Ex. 3 | 1.0 | 0.922 | 4.1 | 240 | 51 | 19.5 | 29.0 |

Example 4
Preparation of an ethylene/α-olefin copolymer
[Preparation of a Catalyst Component]

The procedure for preparing the catalyst component in Preparation Example 1 was repeated except for varying the amounts of the zirconium compounds to those given below, to prepare a catalyst component.

A toluene solution of bis(1,3-n-butylmethylcyclopentadienyl)zirconium dichloride (Zr: 34.0 mmol/l): 7.4 liters A toluene solution of bis(1,3-dimethylcyclopentadienyl)zirconium dichloride (Zr: 28.1 mmol/1): 1.0 liters
[Preparation of a Prepolymerized Catalyst]

The procedure for preparing the prepolymerized catalyst in Preparation Example 1 was repeated except for using the catalyst component prepared above, to obtain a prepolymerized catalyst.
[Polymerization]

Copolymerization of ethylene with 1-hexene was carried out by the use of two fluidized bed gas phase polymerizers of continuous type combined with each other in series. In the first stage, under the conditions of a total pressure of 18 kg/cm$^2$-G and a polymerization temperature of 75° C., to the polymerizer were continuously fed the prepolymerized catalyst prepared above at a feed rate of 1.5 mmol/hr in terms of zirconium atom and triisobutylaluminum at a feed rate of 30 mmol/hr while continuously feeding ethylene, 1-hexene, hydrogen and nitrogen to maintain a constant gas composition (gas composition: 1-hexene/ethylene=0.040, hydrogen/ethylene=4.0×10$^{-4}$, ethylene concentration=25%) during the polymerization.

In the second stage, under the conditions of as total pressure of 16 kg/cm$^2$-G and a polymerization temperature of 75° C., to the polymerizer were continuously fed ethylene, 1-hexene, hydrogen arid nitrogen (gas composition: 1-hexene/ethylene=0.020, hydrogen/ethylene=16×10$^{-4}$, ethylene concentration=34%).

In the first stage, the residence time was 3 hours, and a copolymer was prepared at a rate of 60 kg/hr. The copolymer thus obtained had MFR of 0.5 g/10 min, a density of 0.912 g/cm$^3$ and a decane-soluble portion quantity at 23° C. of 0.55% by weight. In the second stage, the residence time was 1.5 hours, and a copolymer was prepared at a rate of 33 kg/hr in the second-stage polymerizer. The copolymer thus obtained had MFR of 1.5 g/10 min, a density of 0.922 g/cm3 and a decane-soluble portion quantity at 23° C. of 0.51% by weight.
[Preparation of a Film]

The ethylene/1-hexene copolymer obtained above was subjected to inflation in the same manner as described in Example 1 to form a film having a thickness of 30 μm.

Melt properties and other properties of the ethylene/1-hexene copolymer and physical properties of the film formed From the copolymer are set forth in Table 4.

As is evident from Table 4, an inflation film excellent in moldability, optical characteristics and mechanical strength was obtained from the copolymer.

Comparaative Example 3

Copolymerization of ethylene with 1-hexene was carried out by the use of one fluidized bed gas phase polymerizer of continuous type. The catalyst used herein was the same as that used in Example 4.

The ethylene/1-hexene copolymer obtained above had MFR of 1.5 g/10 min and a density of 0.922 g/cm3.

The ethylene/1-hexene copolymer was subjected to inflation in the same manner as described in Example 1 to form a film having a thickness of 30 μm.

Melt properties and other properties of the ethylene/1-hexene copolymer and physical properties of the film formed from the copolymer are set forth in Table 4.

As is evident from Table 4, the ethylene/1-hexene copolymer obtained in Example 4 was superior in the flow index (FI) within high-shear region to that of Comparative Example 3, and the inflation film obtained in Example 4 was superior in the film impact to that of Comparative example 3, although the copolymer of Example 4 was almost the same as the copolymer of Comparative Example 3 in the MFR and the density.

Example 5
Preparation of an ethylene/α-olefin copolymer
[Polymerization]

The procedure for the polymerization in Example 4 was repeated except for using the prepolymerized catalyst prepared in Preparation Example 1, to obtain an ethylene/1-hexene copolymer different in MFR and density from the copolymer of Example 4. The copolymer thus obtained had MFR of 2.2 g/10 min, a density of 0.923 g/cm3 and a decane-soluble portion quantity at 23° C. of 0.46% by weight.

The ethylene/1-hexene copolymer was subjected to inflation in the same manner as described in Example 1 to form a film having a thickness of 30 μm.

Melt properties and other properties of the ethylene/1-hexene copolymer and physical properties of the film formed from the copolymer are set forth in Table 4.

As is evident from Table 4, an inflation film excellent in moldability, optical characteristics and mechanical strength was obtained from the copolymer.

Comparative Example 4

Copolymerization of ethylene with 1-hexene was carried out by the use of one fluidized bed gas phase polymerizer of continuous type. The catalyst used herein was the same as that used in Example 5.

The ethylene/1-hexene copolymer obtained above had MFR of 2.1 g/10 min arid a density of 0.923 g/cm$^3$.

The ethylene/1-hexene copolymer was subjected to inflation in the same manner as described in Example 1 to form a film having a thickness of 30 μm.

Melt properties and other properties of the ethylene/1-hexene copolymer and physical properties of the film formed from the copolymer are set forth in Table 4.

As is evident from Table 4, the ethylene11-hexene copolymer obtained in Example 5 was superior in the flow index (FI) within high-shear region to that of Comparative Example 4, and the inflation film obtained in Example 5 was superior in the film impact to that of Comparative example 4, although the copolymer of Example 5 was almost the same as the copolymer of Comparative Example 4 in the MFR and the density.

Example 6
Preparation of an ethylene/α-olefin copolymer
[Preparation of a Catalyst Component]

The procedure for preparing the catalyst component in Preparation Example 1 was repeated except for varying the amounts of the zirconium compounds to those given below, to prepare a catalyst component.

A toluene solution of bis(1,3-n-butylmethylcyclopentadienyl)zirconium dichloride (Zr: 34.0 mmol/l): 5.6 liters A toluene solution of bis(1,3-dimethylcyclopentadienyl)zirconium dichloride (Zr: 28.1 mmol/l): 2.9 liters
[Preparation of a Prepolymerized Catalyst]

The procedure for preparing the prepolymerized catalyst in Preparation Example 1 was repeated except for using the catalyst component prepared above, to obtain a prepolymerized catalyst.
[Polymerization]

The procedure for the polymerization in Example 4 was repeated except for using the prepolymerized catalyst prepared above, to obtain an ethylene/1-hexene copolymer different in MFR and density from the copolymer of Example 4. The copolymer thus obtained had MFR of 1.2 g/10 min, a density of 0.920 g/cm³ and a decane-soluble portion quantity at 23° C. of 0.52% by weight.

The ethylene/1-hexene copolymer was subjected to inflation in the same manner as described in Example 1 to form a film having a thickness of 30 μm.

Melt properties and other properties of the ethylene/1-hexene copolymer and physical properties of the film formed from the copolymer are set forth in Table 4.

As is evident from Table 4, an inflation film excellent in moldability, optical characteristics and mechanical strength was obtained from the copolymer.

Comparative Example 5

Copolymerization of ethylene with 1-hexene was carried out by the use of one fluidized bed gas phase polymerizer of continuous type. The catalyst used herein was the same as that used in Example 6.

The ethylene/1-hexene copolymer obtained above had MFR of 1.2 g/10 min and a density of 0.919 g/cm³.

The ethylene/1-hexene copolymer was subjected to inflation in the same manner as described in Example 1 to form a film having a thickness of 30 μm.

Melt properties and other properties of the ethylene/1-hexene copolymer and physical properties of the film formed from the copolymer are set forth in Table 4.

As is evident from Table 4, the ethylene/1-hexene copolymer obtained in Example 6 was superior in the flow index (FI) within high-shear region to that of Comparative Example 5, and the inflation film obtained in Example 6 was superior in the film impact to that of Comparative example 5, although the copolymer of Example 6 was almost the same as the copolymer of Comparative Example 5 in the MFR and the density.

TABLE 4

| | Comonomer | | Catalyst*1 | First Stage | | | |
|---|---|---|---|---|---|---|---|
| | Kind | Amount mol. % | I/II by mol | MRF g/10-min | [η] dl/g | Mw/Mn | Density g/cm³ |
| Ex. 4 | 1-hexene | — | 9/1 | 0.50 | 2.09 | 2.6 | 0.912 |
| Comp. Ex. 3 | 1-hexene | 2.9 | 9/1 | — | — | — | — |
| Ex. 5 | 1-hexene | — | 8/2 | 0.45 | 2.10 | 2.8 | 0.911 |
| Comp. Ex. 4 | 1-hexene | 2.9 | 8/2 | — | — | — | — |
| Ex. 6 | 1-hexene | — | 7/3 | 0.38 | 2.21 | 3.0 | 0.909 |
| Comp. Ex. 5 | 1-hexene | 3.3 | 7/3 | — | — | — | — |

| | First Stage | | | | | | |
|---|---|---|---|---|---|---|---|
| | n-Decane Soluble Portion wt. % | Tm °C. | MT g | *2 | FI s⁻¹ | *3 | MT/Mw/Mn | *4 |
| Ex. 4 | 0.55 | 99.6 | 6.4 | 3.9 | 32 | 75 | 2.46 | 0 |
| Comp. Ex. 3 | — | — | — | — | — | — | — | — |
| Ex. 5 | 0.48 | 101.0 | 6.0 | 4.3 | 53 | 68 | 2.14 | 0.53 |
| Comp. Ex. 4 | — | — | — | — | — | — | — | — |
| Ex. 6 | 0.56 | 93.5 | 7.2 | 5.0 | 49 | 57 | 2.40 | 0.87 |
| Comp. Ex. 5 | — | — | — | — | — | — | — | — |

| | MFR g/10-min | Density g/cm³ | n-Decane Soluble Portion wt. % | Tm °C. | MT g | FI s⁻¹ |
|---|---|---|---|---|---|---|
| Ex. 4 | 1.5 | 0.922 | 0.51 | — | 3.1 | 176 |
| Comp. Ex. 3 | 1.5 | 0.922 | — | 114.4 | 3.1 | 105 |
| Ex. 5 | 2.2 | 0.923 | 0.46 | — | 2.0 | 353 |
| Comp. Ex. 4 | 2.1 | 0.923 | — | 114.5 | 2.1 | 212 |
| Ex. 6 | 1.2 | 0.920 | 0.52 | — | 4.5 | 213 |
| Comp. Ex. 5 | 1.2 | 0.919 | 0.57 | 114.2 | 4.5 | 94 |

| | Physical Properties of Film | | | |
|---|---|---|---|---|
| | Haze % | Gloss % | Impact Strength kg · cm/cm | Moldability*6 |
| Ex. 4 | 8.0 | 69 | NB*5 | AA |
| Comp. Ex. 3 | 4.4 | 89 | 3,950 | AA |
| Ex. 5 | 8.4 | 63 | 6,880 | BB |
| Comp. Ex. 4 | 4.6 | 85 | 3,270 | BB |
| Ex. 6 | 8.8 | 57 | NB*5 | AA |
| Comp. EX. 5 | 6.2 | 61 | 7,320 | AA |

*1Zirconium compound in the catalyst component
I: bis(1,3-n-butylmethylcyclopentadienyl)zirconium dichloride
II: bis(1,3-dimethylcyclopentadienyl)zirconium dichloride
*2: value of $2.2 \times MFR^{-0.84}$
*3: value of $150 \times MFR$
*4: value of $0.03 \times FI/MFR - 3.0$ (In the case of less than 0, the value is taken as 0.)
*5NB: not broken (film impact > 8,500 kg · cm/cm)
*6Moldability
AA: MT ≧ 3 g
BB: 3 g > MT ≧ 2 g
CC: 2 g > MT

What is claimed is:

1. A moldable graft modified ethylene/α-olefin copolymer composition comprising (I) a graft-modified ethylene/α-olefin copolymer composition obtained by graft copolymerizing an ethylene/α-olefin copolymer composition with a polar monomer, wherein the ethylene/α-olefin copolymer composition comprises:

(A1) an ethylene/α-olefin copolymer in an amount of 20 to 90% by weight, which is obtained by copolymerizing ethylene with an α-olefin of 3 to 20 carbon atoms in the presence of a catalyst for olefin polymerization comprising (a) an organoaluminum oxy-compound and (b) at least one kind of a transition metal compound represented by the following formula (b-I):

$$ML^1_x \qquad (b\text{-}I)$$

wherein M is a transition metal atom selected from Group IVB of the periodic table, $L^1$ is a ligand coordinating to the transition metal atom M, at least two of $L^1$ are groups selected from a cyclopentadienyl group, a methylcyclopentadienyl group an ethylcyclopentadienyl group and a substituted group selected from a hydrocarbon group of 3 to 10 carbon atoms, $L^1$ other than the (substituted) cyclopentadienyl group is a hydrocarbon group of 1 to 12 carbon atoms, an alkoxy group, an aryloxy group, a trialkylsilyl group, a halogen atom or a hydrogen atom, and X is a valence of the transition metal atom M, and at least one kind of a transition metal compound represented by the following formula (b-I)

$$ML^2_x \qquad (b\text{-}II)$$

wherein M is a transition metal atom selected from Group IVB of the periodic table, $L^2$ is a ligand coordinating to the transition metal atom, at least two of $L^2$ are substituted cyclopentadienyl groups having 2–5 substituent groups selected from a methyl group and an ethyl group, $L^2$ other than the substituted cyclopentadienyl group is a hydrocarbon group of 1 to 12 carbon atoms, and alkoxy group, an aryloxy group, a trialkylsilyl group, a halogen atom or a hydrogen atom, and X is a valence of the transition metal atom M, and which has such properties that:

(A-i) the density is in the range of 0.850 to 0.980 g/cm³, (A-ii) the intrinsic viscosity (η) as measured in decalin at 135° C. is in the range of 0.4 to 8 dl/g; and (A-iii) the melt tension (MT(g)) at 190° C. and the melt flow rate (MFR) satisfy the relation $$MT > 2.2 \times MFR^{-0.84}, \text{ and}$$

(B1) an ethylene/α-olefin copolymer in an amount of 10 to 80% by weight, which has a density and MFR different from the ethylene/α-olefin copolymer (A1) and is obtained by copolymerizing ethylene with an α-olefin of 3 to 20 carbon atoms in the presence of a catalyst for olefin polymerization comprising (a) an organoaluminum oxy-compound and (b') a compound of Group IV transition metal of the periodic table containing a ligand having a cyclopentadienyl skeleton, and which has such properties that:

(B-i) the density is in the range of 0.850 to 0.980 g/cm³, and (B-ii) the intrinsic viscosity (η) as measured in decalin at 135° C. is in the range of 0.4 to 8 dl/g and, (II) a polyolefin selected from the group consisting of polyethylene, poly ($C_{3-20}$ α-olefin), and copolymer comprising repeating units of at least two monomers selected from ethylene and α-olefins of 3 to 20 carbon atoms;

wherein the weight ratio of the graft modified ethylene/α-olefin copolymer composition (I) and the polyolefin (II) is in the range of from 1:99 to 99:1.

2. The composition according to claim 1 wherein the weight ratio of graft-modified ethylene/α-olefin copolymer (I) and polyolefin (II) is from 2:98 to 98:2.

3. The composition according to claim 1 wherein the ethylene/α-olefin copolymer (A1) has the following properties:

(A-i) a density in the range of 0.890 to 0.935 g/cm³;

(A-ii) an intrinsic viscosity (η) as measured in decalin at 135° C., in the range of 1.25 to 8 dl/g; and (A-iii) a melt tension (MT (g)) at 190° C. and melt flow rate (MFR) satisfying the relation:

$$7.5 \times MFR^{-0.84} > MT > 2.5 \times MFR^{-0.84};$$

and the ethylene/α-olefin copolymer (B1) has the following properties:

(B-i) a density in the range of from 0.910 to 0.960 g/cm³;

(B-ii) intrinsic viscosity (η), measured in decalin at 135° C., in the range of 0.5 to 1.23 dl/g.

4. The composition according to claim 3 wherein the ethylene/α-olefin copolymer composition comprises from 40 to 75% by weight of the ethylene/α-olefin copolymer (A1) and from 25 to 60% by weight of the ethylene/α-olefin copolymer (B1).

5. The composition according to claim 4 wherein the ethylene/α-olefin copolymer which is graft copolymerized with a polar monomer has the following properties:

(ii) a density in the range of from 0.890 to 0.95 g/cm³;

(iii) a melt flow rate (MFR) measured at a temperature of 190° C. and with a load of 2.16 kg, in the range of 0.2 to 50 g/10 min.;

(iv) a melt tension (MT(g)) at 190° C., and the melt flow rate (MFR) satisfying the relation:

$$MT >= 2.2 \times MFR^{-0.84};$$

(v) a flow index (FI (1/sec)) defined by a shear rate which is given when a shear stress at 190° C. reaches $2.4 \times 10^6$ dyne/cm² which is more than 130 times the melt flow rate (MFR);

(vi) the temperature (TM (°C)) at which the endothermic curve of the composition measured by a differential scanning calorimeter shows a maximum peak which has the following relationship with the density (d):

$$TM < 450 \times d - 297;$$

(vii) the quantity fraction (W (percent by weight)) of an n-decane-soluble component at room temperature which has the following relationship with the density (d):

when MFR ≦ 10 g/10 min.:

$$W < 60 \times exp(-100(d-0.88)) + 0.1;$$

and when MFR > 10 g/10 min.:

$$W < 80 \times (MFR-9)^{0.26} \times exp(-100(d-0.88)) + 0.1.$$

* * * * *